(12) United States Patent
Adlem et al.

(10) Patent No.: US 8,323,527 B2
(45) Date of Patent: Dec. 4, 2012

(54) FLUORENE DERIVATIVES

(75) Inventors: Kevin Adlem, Dorset (GB); Owain Llyr Parri, Hampshire (GB); Karl Skjonnemand, Southampton (GB); David Wilkes, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/676,054

(22) PCT Filed: Aug. 18, 2008

(86) PCT No.: PCT/EP2008/006754
§ 371 (c)(1),
(2), (4) Date: Jul. 14, 2010

(87) PCT Pub. No.: WO2009/030352
PCT Pub. Date: Mar. 12, 2009

(65) Prior Publication Data
US 2010/0301271 A1   Dec. 2, 2010

(30) Foreign Application Priority Data

Sep. 3, 2007  (EP) .................................. 07017202

(51) Int. Cl.
| C09K 19/00 | (2006.01) |
| C09K 19/06 | (2006.01) |
| C09K 19/32 | (2006.01) |
| G02F 1/1335 | (2006.01) |
| C07C 255/00 | (2006.01) |

(52) U.S. Cl. ........... 252/299.62; 252/299.01; 252/299.6; 428/1.1; 428/1.3; 349/1; 349/86; 349/118; 349/182; 560/80; 558/399

(58) Field of Classification Search ............. 252/299.01, 252/299.6, 299.62; 430/20; 428/1.1, 1.3; 349/86, 182, 1, 118; 560/80; 558/399
See application file for complete search history.

(56) References Cited

U.S. PATENT DOCUMENTS

| 5,567,349 A | 10/1996 | Kelly et al. |
| 6,139,771 A | 10/2000 | Walba et al. |
| 6,203,724 B1 | 3/2001 | Reiffenrath et al. |
| 2004/0222403 A1 | 11/2004 | Sasada et al. |
| 2006/0222784 A1 | 10/2006 | Saigusa et al. |
| 2007/0176145 A1 | 8/2007 | Nishikawa et al. |
| 2007/0284556 A1 | 12/2007 | O'Neill et al. |

FOREIGN PATENT DOCUMENTS

| JP | 403073960 A | * | 3/1991 |
| WO | WO 2005/085222 A1 | | 9/2005 |
| WO | WO 2005/095543 A2 | | 10/2005 |

OTHER PUBLICATIONS

International Search Report of PCT/EP2008/006754 (Oct. 21, 2008).

* cited by examiner

*Primary Examiner* — Geraldina Vlsconti
(74) *Attorney, Agent, or Firm* — Millen, White, Zelano & Branigan, P.C.

(57) ABSTRACT

The invention relates to novel fluorene derivatives, which are especially suitable for use in birefringent films with negative optical dispersion, to novel liquid crystal (LC) formulations and polymer films comprising them, and to the use of the fluorene derivatives, formulations and films in optical, electrooptical, electronic, semiconducting or luminescent components or devices.

19 Claims, 2 Drawing Sheets

FLUORENE DERIVATIVES

FIELD OF THE INVENTION

The invention relates to novel fluorene derivatives, which are especially suitable for use in birefringent films with negative optical dispersion, to novel liquid crystal (LC) formulations and polymer films comprising them, and to the use of the fluorene derivatives, formulations and films in optical, electrooptical, electronic, semiconducting or luminescent components or devices.

BACKGROUND AND PRIOR ART

There is a need for anisotropic optical films that demonstrate negative optical retardation dispersion. For example, a quarter wave film made with negative dispersion birefringent materials will be largely achromatic. Devices such as a reflective LCD that utilises such a quarter wave film will have a dark state that is not coloured. Currently such devices have to use two retarder films to achieve this effect. The dispersive power of such a film can be defined in many ways, however one common way is to measure the optical retardation at 450 nm and divide this by the optical retardation measured at 550 nm ($R_{450}/R_{550}$). If the on-axis retardation of a negative retardation dispersion film at 550 nm is 137.5 nm and the $R_{450}/R_{550}$ value is 0.82, then such a film will be a largely a quarter wave for all wavelengths of visible light and a liquid crystal display device (LCD) using this film as, for example, a circular polarizer would have a substantially black appearance. On the other hand, a film made with an on axis of 137.5 nm which had normal positive dispersion (typically $R_{450}/R_{550}=1.13$) would only be a quarter wave for one wavelength (550 nm), and an LCD device using this film as, for example, a circular polarizer would have a purple appearance. Another way of representing this information is to plot the change in birefringence as a function of wavelength. FIG. 1 shows a typical birefringence against wavelength plot for a polymerized film made from the commercially available reactive mesogen RM257 (Merck KgaA, Darmstadt, Germany). The $R_{450}/R_{550}$ for this compound is around 1.115.

In an anisotropic optical film formed by rod-shaped, optically anisotropic molecules, the origin of the retardation dispersion is due to the fact that the two refractive indices $n_e$, $n_o$, of the anisotropic molecules (wherein $n_e$ is the "extraordinary refractive index" in the direction parallel to the long molecular axis, and $n_o$ is the "ordinary refractive index" in the directions perpendicular to the long molecular axis) are changing with wavelength at different rates, with $n_e$ changing more rapidly than $n_o$ towards the blue end of the visible wavelength spectrum. One way of preparing material with low or negative retardation dispersion is to design molecules with increased $n_o$ dispersion and decreased $n_e$ dispersion. This is schematically shown in FIG. 2. Such an approach has been demonstrated in prior art to give LC's with negative birefringence and positive dispersion as well as compounds with positive birefringence and negative dispersion.

Thus, molecules that can be formed into anisotropic films that demonstrate the property of negative or reverse retardation dispersion have been disclosed in prior art. For example, JP2005-208416 A1 and WO 2006/052001 A1 disclose polymerizable materials based on a "cardo" core group. JP2005-208414 A1 discloses molecules that have covalently bonded discs and rods. JP2005-208415 A1 and JP2002-267838 A1 disclose materials that possess a cross-shape with short high refractive index parts of the molecule crossed with longer lower refractive index parts. WO 2005-085222 A1 discloses molecules that have two lower refractive index parts connected by a higher refractive index bridge part. The bridge is predominantly connected to the rods via a fused five-membered heterocyclic ring. All the above-mentioned documents disclose molecules that not only demonstrate negative dispersion, but also contain at least one polymerizable group and can therefore be polymerized when exposed to either heat or UV irradiation. These materials can be processed either as single materials, or as a mixture to give thin films which under the appropriate conditions can demonstrate uniform anisotropic properties. If photoinitiator is also included in the mixture, the anisotropic properties can be locked in by exposing the film to UV irradiation. This method of preparing optical films is well known.

Another class of materials which is claimed to demonstrate negative birefringence is disclosed in U.S. Pat. No. 6,139,771, which describes compounds generally consisting of two rod-shaped LC parts connected by a acetylenic or bis-acetylenic bridging group. The bridging group is connected to the two rod-shaped parts using a benzene ring. However the document does neither disclose nor suggest polymerizable versions of these compounds.

U.S. Pat. No. 6,203,724 discloses molecules generally consisting of two rod-shaped LC parts connected by highly dispersive bridging groups. The bridging group is connected to the rod-shaped parts via the axial position of a cyclohexane ring. However the document does neither disclose nor suggest to use such compounds for the preparation of optical polymer films having negative optical dispersion.

U.S. Pat. No. 5,567,349 discloses dimers (or H-shaped RM's) wherein the bridging group is connected to the rod shaped part of the molecule via a phenyl ring, however, this document does not report that the molecules demonstrate negative dispersion or negative birefringence.

The materials known form prior art often have thermal properties that are not suitable for processing under standard industrial processes, or are not soluble in the solvents commonly used in standard industrial processes, or are not compatible with host RM materials commonly used in standard industrial processes, or are too expensive to manufacture.

This invention has the aim of providing improved compounds for use in LC formulations and polymer films having negative dispersion, which do not have the drawbacks of the prior art materials.

Another aim of the invention is to extend the pool of materials and polymer films having negative dispersion that are available to the expert. Other aims are immediately evident to the expert from the following description.

It has been found that these aims can be achieved by providing compounds, materials, methods and films as claimed in the present invention.

SUMMARY OF THE INVENTION

The invention relates to mesogenic fluorene derivatives having a structural element of the following formula

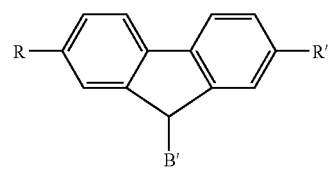

wherein
B' is a monovalent or bivalent group having high polarizability,
R, R' are independently of each other a mesogenic group comprising at least one ring, These compounds have the capability of inducing or enhancing a negative optical dispersion in liquid crystalline materials, and can be used for the manufacture of polymer films exhibiting a negative dispersion.

The invention more specifically relates to fluorene derivatives comprising one or more structural elements of the following formula:

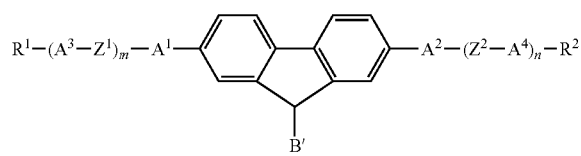

wherein
B' is —(B)$_q$— or —(B)$_q$—R$^3$,
B is —C≡C—, —CY$^1$=CY$^2$— or an optionally substituted aromatic or heteroaromatic group,
q is an integer from 1 to 10, preferably 1, 2, 3, 4, 5 or 6,
Y$^{1,2}$ are independently of each other H, F, Cl, CN or R$^0$,
A$^{1-4}$ are independently of each other identical or different groups selected from non-aromatic, aromatic or heteroaromatic carbocylic or heterocyclic groups, which are optionally substituted by one or more groups R$^1$,
Z$^{1,2}$ are independently of each other identical or different groups selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
R$^0$ and R$^{00}$ are independently of each other H or alkyl with 1 to 12 C-atoms,
m and n are independently of each other 0, 1, 2, 3 or 4,
R$^{1-3}$ are independently of each other identical or different groups selected from H, halogen, —CN, —NC, —NCO, —NCS, —OCN, —SCN, —C(=O)NR$^0$R$^{00}$, —C(=O) X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^1$, R$^2$ or R$^3$ denoting or being substituted by P or P-Sp-,
P is a polymerizable group,
Sp is a spacer group or a single bond,
and wherein the fluorene group is optionally substituted by one or more groups R$^1$.

The invention further relates to an LC formulation comprising one or more fluorene derivatives as described above and below.

The invention further relates to a polymerizable LC formulation comprising one or more fluorene derivatives as described above and below and one or more further compounds, wherein at least one of the compounds is polymerizable.

The invention further relates to a birefringent polymer obtainable by polymerizing a fluorene derivative or LC formulation as described above and below, preferably in its LC phase in an oriented state in form of a thin film.

The invention further relates to a birefringent polymer film with R$_{450}$/R$_{550}$<1, wherein R$_{450}$ is the optical on-axis retardation at a wavelength of 450 nm and R$_{550}$ is the optical on-axis retardation at a wavelength of 550 nm, said film being obtainable by polymerizing one or more compounds or LC formulations as described above and below.

The invention further relates to the use of fluorene derivatives, LC formulations and polymers as described above and below in optical, electronic and electrooptical components and devices, preferably in optical films, retarders or compensators having negative optical dispersion.

The invention further relates to an optical, electronic or electrooptical component or device, comprising a fluorene derivative, LC formulation or or polymer as described above and below.

Said devices and components include, without limitation, electrooptical displays, LCDs, optical films, polarizers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

TERMS AND DEFINITIONS

Figure 1:
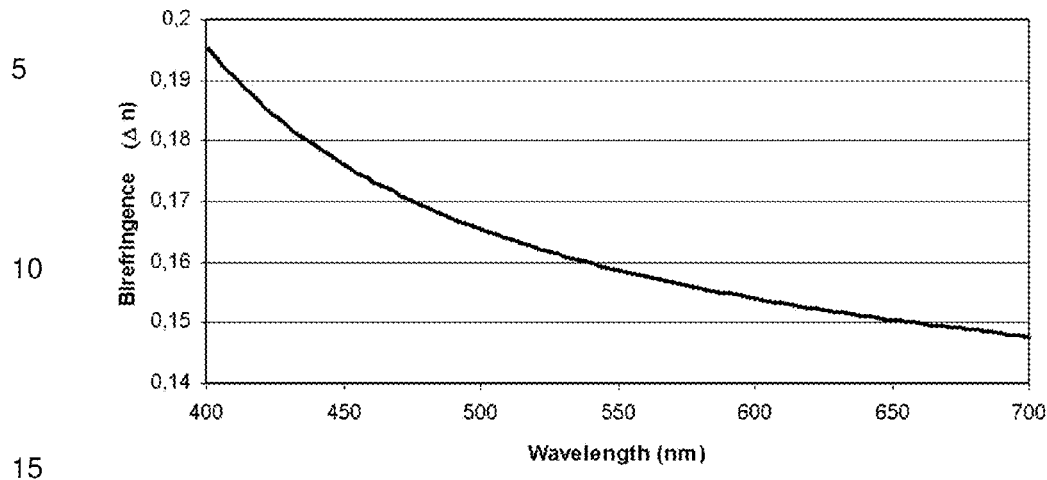
FIG. 1 shows the birefringence versus wavelength plot for a polymerized film made from a reactive mesogen of prior art.
Figure 2:
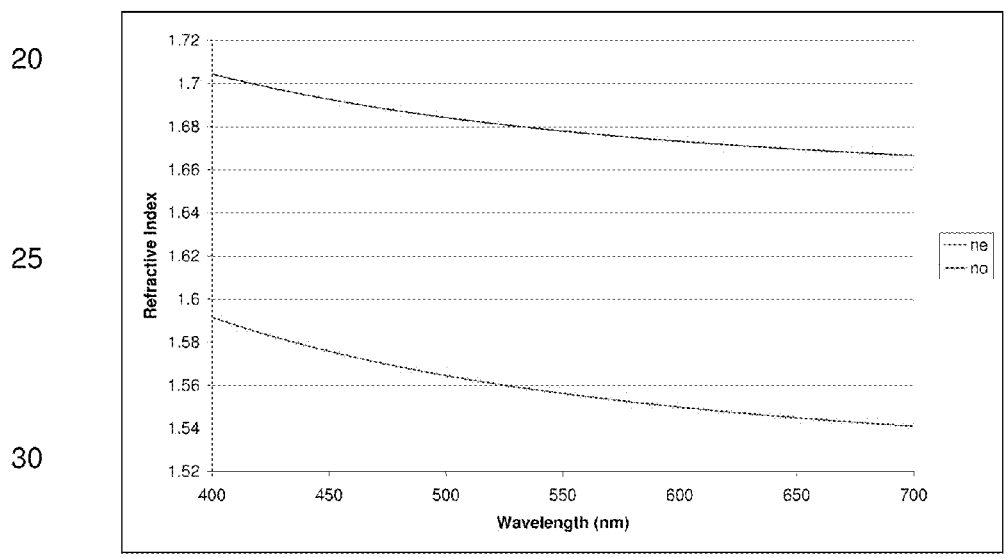
FIG. 2 shows the refractive index versus wavelength plot of a modelled molecule with low or negative retardation dispersion, showing increased n$_o$ dispersion and decreased n$_e$ dispersion.

The term "liquid crystal or mesogenic compound" means a compound comprising one or more calamitic (rod- or board/lath-shaped) or discotic (disk-shaped) mesogenic groups.

The term "calamitic compound" or "calamitic group" means a rod- or board/lath-shaped compound or group.

The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or the mixtures thereof are polymerized. For the sake of simplicity, the term "liquid crystal" is used hereinafter for both mesogenic and LC materials. For an overview of definitions see Pure Appl. Chem. 73(5), 888 (2001) and C. Tschierske, G. Pelzl and S. Diele, Angew. Chem. 2004, 116, 6340-6368.

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerisable mesogenic compound ("RM") connects the mesogenic group and the polymerisable group(s).

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerizable groups.

The term "reactive mesogen" (RM) means a polymerizable mesogenic or liquid crystal compound.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

The term "film" includes rigid or flexible, self-supporting or free-standing films with mechanical stability, as well as coatings or layers on a supporting substrate or between two substrates.

The term "pi-conjugated" means a group containing mainly C atoms with $sp^2$-hybridisation, or optionally also sp-hybridisation, which may also be replaced by hetero atoms. In the simplest case this is for example a group with alternating C—C single and double bonds, or triple bonds, but does also include groups like 1,3- or 1,4-phenylene. Also included in this meaning are groups like for example aryl amines, aryl phosphines and certain heterocycles (i.e. conjugation via N-, O-, P- or S-atoms).

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

On the molecular level, the birefringence of a liquid crystal depends on the anisotropy of the polarizability ($\Delta\alpha=\alpha_\parallel-\alpha_\perp$). "Polarizability" means the ease with which the electron distribution in the atom or molecule can be distorted. The polarizability increases with greater number of electrons and a more diffuse electron cloud. The polarizability can be calculated using a method as described e.g. in Jpn. J. Appl. Phys. 42, (2003) p 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda)=\Delta n(\lambda)\cdot d$$

The optical retardation R represents the difference in the optical path lengths in nanometers traveled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e $|\Delta n(450)|<|\Delta n(550)|$, or $\Delta n(450)/\Delta n(550)<1$, where $\Delta n(450)$ and $\Delta n(550)$ are the birefringence of the material measured at wavelengths of 450 nm and 550 nm respectively. In contrast, positive (optical) dispersion" means a material or layer having $|\Delta n(450)|>|\Delta n(550)|$ or $\Delta n(450)/\Delta n(550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Figure 3A:
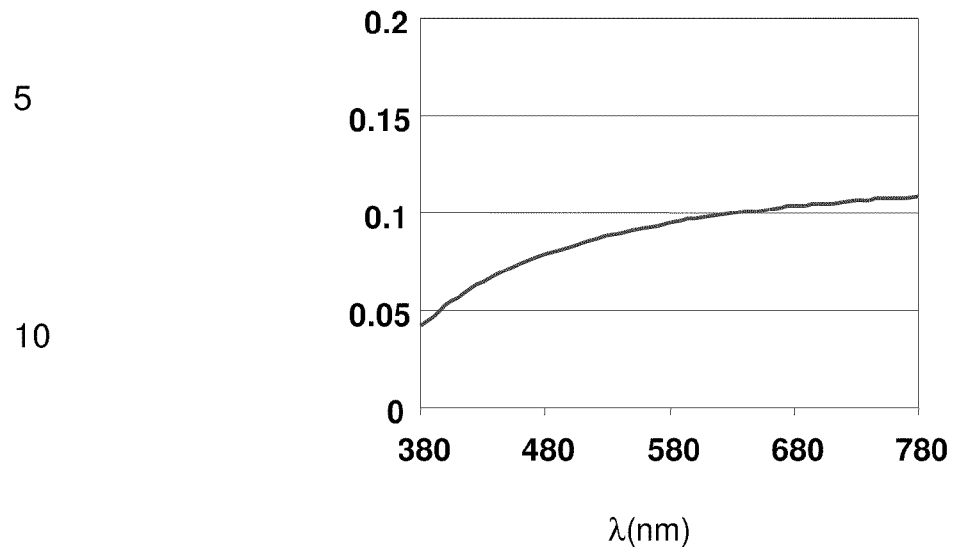
FIG. 3a and FIG. 3b show the birefringence versus wavelength plot for a compound with negative optical dispersion (3a) and positive optical dispersion (3b), respectively.

This is shown schematically in FIG. 3a.

Since the optical retardation at a given wavelength is defined as the product of birefringence and layer thickness as described above [$R(\lambda)=\Delta n(\lambda)\cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550)<1$ or $|R(450)|<|R(550)|$, and a material or layer with positive or normal dispersion has $R(450)/R(550)>1$ or $|R(450)|>|R(550)|$.

In the present invention, unless stated otherwise "optical dispersion" means the retardation dispersion i.e. the ratio ($R(450)/R(550)$).

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

DETAILED DESCRIPTION OF THE INVENTION

Preferably the birefringent polymer film according to the present invention is prepared by polymerizing an LC formulation comprising one or more fluorene derivatives having the structural features as described above and below, hereinafter referred to as "guest component" or "guest compound", and further comprising an LC material, which may be a single compound or a mixture of compounds, hereinafter referred to as "host component" or "host mixture", preferably a polymerizable LC host mixture having a nematic phase. The terms "guest" and "host" do not exclude the possibility that the amount of the guest component in the final LC mixture is >50% by weight, and the amount of the host component in the final LC mixture is <50% by weight.

The birefringent polymer film preferably has positive birefringence and negative (or "reverse") dispersion.

The host component preferably has positive birefringence and positive (or "normal") dispersion.

The guest component preferably has
(1) Negative birefringence at 550 nm and normal (positive) birefringence dispersion (e.g. negative calamitic compound) or
(2) Positive birefringence at 550 nm and reverse (negative) birefringence dispersion. In this case $\Delta n(450)/\Delta n(550)$ can be negative if the guest component has a negative birefringence at 450 nm.

In the fluorene derivatives, the mesogenic groups are preferably calamitic groups, very preferably rod-shaped groups.

In the fluorene derivatives, the mesogenic groups R, R' preferably comprise one or more groups selected from aromatic or heteroaromatic rings, and non-aromatic, e.g. fully or partially saturated, carbocyclic or heterocyclic groups, said groups being linked to each other either directly or via linkage groups.

Preferably the mesogenic groups R, R' are selected such that they exhibit a low polarizability. This can be achieved e.g. by using mesogenic groups that are preferably comprising mainly non-aromatic, most preferably fully saturated, carbocyclic or heterocyclic groups which are connected directly or via linkage groups, wherein "mainly" means that each mesogenic group comprises more saturated rings than unsaturated or aromatic rings, and very preferably does not comprise more than one unsaturated or aromatic ring.

The group B' having high polarizability is preferably consisting mainly, very preferably exclusively, of one or more subgroups B, which are selected from pi-conjugated linear groups, aromatic and heteroaromatic groups.

Preferably the group B' consists, very preferably exclusively, of one or more subgroups B selected from groups having a bonding angle of 120° or more, preferably in the range of 180°. Suitable and preferred subgroups B include, without limitation, groups comprising sp-hybridised C-atoms, like —C≡C—, or divalent aromatic groups connected to their neighboured groups in para-position, like e.g. 1,4-phenylene, naphthalene-2,6-diyl, indane-2,6-diyl or thieno[3,2-b]thiophene-2,5-diyl.

Since the group B' is a linear group consisting of subgroups B having bonding angles of approx. 180°, and is linked to the calamitic compound via an sp³-hybridised C-atom (i.e. with a bonding angle of approx. 109°), the compounds of the present invention have an H-shaped structure, wherein the mesogenic groups are substantially parallel to each other and substantially perpendicular to the group B'.

Figure 3B:
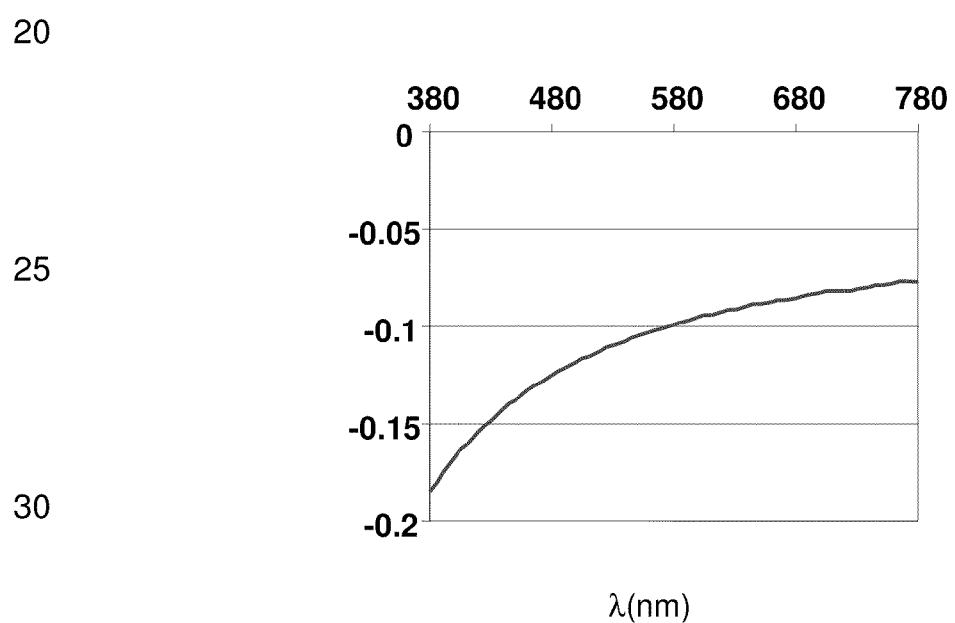

The group B', which essentially consists of subgroups B with pi-conjugation, has a high polarizability and a high refractive index. If the mesogenic groups R, R' are selected to have a low polarizability and a low refractive index, then as a result the compounds show, depending on their exact structure, either positive birefringence and negative dispersion, as schematically depicted in FIG. 3a, or negative birefringence with positive dispersion, as schematically depicted in FIG. 3b.

As a reference normal calamitic materials have positive birefringence and positive dispersion. It is desirable to have materials where the magnitude of Δn decreases at shorter wavelength, and compounds with both positive dispersion and negative birefringence can be mixed with a host material to give a mixture which possesses a range of dispersion (depending on the concentration of the dopant and host) varying from positive birefringence with positive dispersion through to positive birefringence with negative dispersion.

Preferably the fluorene derivatives are selected of formula I and II

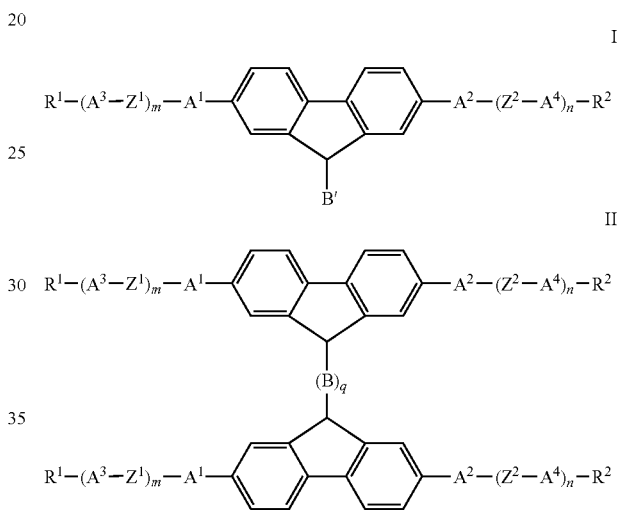

wherein B' is —(B)$_q$—R³, B, q, A$^{1-4}$, Z$^{1,2}$, m, n, R$^{1-2}$, are as defined above, and the fluorene group is optionally substituted by one or more groups R¹.

Especially preferred are compounds of the present invention wherein the groups -A¹-(Z¹-A³)$_m$-R¹ and -A²-(Z²-A⁴)$_n$-R² are identical to each other.

Further preferred are compounds of formula II wherein the two groups R¹-(A³-Z¹)$_m$-A¹-fluorene-A²-(Z²-A⁴)$_n$-R² are identical to each other. Most preferred are compounds of formula I and II that have a symmetry plane.

The subgroups B are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups B include —CH=CH—, —CY¹=CY²—, —CH=N—, —N=CH—, —N=N— and —CH=CR⁰— wherein Y¹, Y², R⁰ have the meanings given above.

Preferably the bridging group, like —(B)$_q$— in formula I, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula I, are selected from —C≡C—, —C≡C—C≡C—, —C≡C—C≡C—C≡C—, —C≡C—C≡C—C≡C—C≡C—,

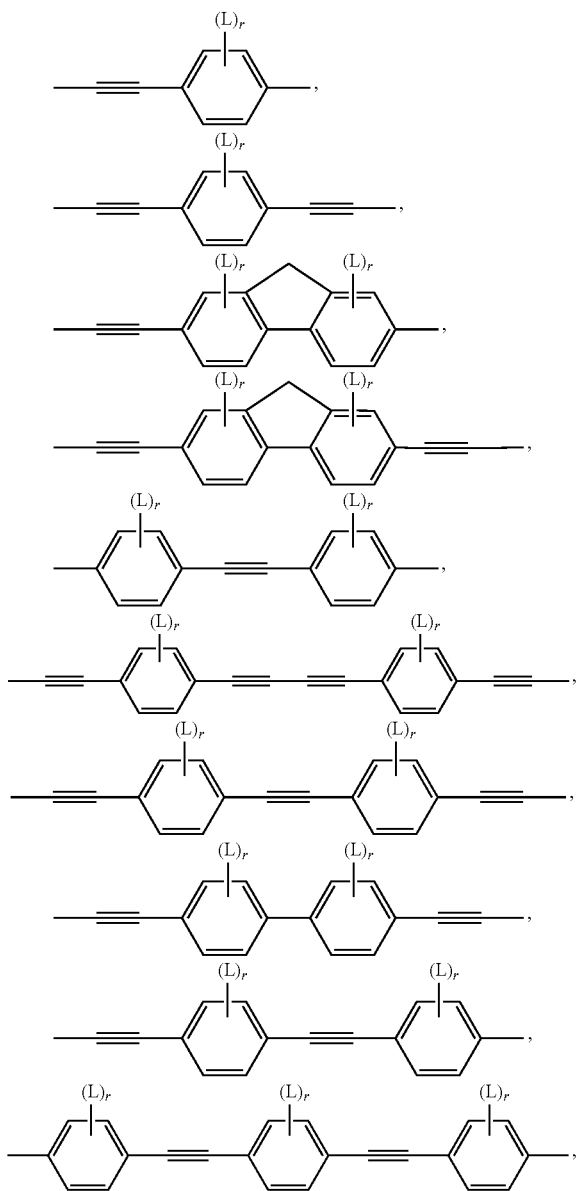

wherein r is 0, 1, 2, 3 or 4 and L has the meaning as described below.

Preferred aromatic groups include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazin-imidazole, quinoxalinimidazole, benzoxazole, naphthoxazole, anthroxa-zole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

The non-aromatic carbocyclic and heterocyclic groups, like A$^{1-4}$, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more C-atoms are optionally replaced by Si and/or one or more CH groups are optionally replaced by N and/or one or more non-adjacent CH$_2$ groups are optionally replaced by —O— and/or —S—, all of which are optionally substituted.

Preferred non-aromatic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methano-indan-2,5-diyl, or combinations thereof.

Preferably the non-aromatic and aromatic rings, like A$^{1-4}$, are selected from trans-1,4-cyclohexylene and 1,4-phenylene that is optionally substituted with one or more groups L.

Very preferably the mesogenic groups comprise not more than one aromatic ring.

Very preferred are compounds of formula I and II wherein m and n are 0, 1 or 2, in particular wherein one of m and n is 0 and the other is 1.

In the calamitic compounds of the present invention, the linkage groups connecting the aromatic and non-aromatic cyclic groups in the mesogenic groups, like Z$^{1-4}$, are preferably selected from —O—, —S—, —CO—, —COO—, —OCO—, —O—COO—, —CO—NR$^\circ$—, —NR$^\circ$—CO—, —NR$^\circ$—CO—NR$^\circ$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

In the calamitic compounds of the present invention, the substituents on the rings, also referred to as "L", are preferably selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula I and X is halogen.

Preferred substituents are selected from F, Cl, CN, NO$_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferred substituents are selected from F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, in particular F, Cl, CN, CH$_3$, C$_2$H$_5$, C(CH$_3$)$_3$, CH(CH$_3$)$_2$, OCH$_3$, COCH$_3$ or OCF$_3$, most preferably F, Cl, CH$_3$, C(CH$_3$)$_3$, OCH$_3$ or COCH$_3$, or P-Sp-.

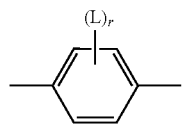

is preferably

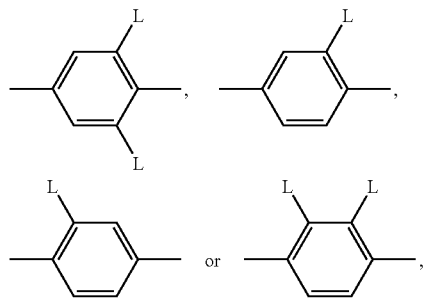

with L having each independently one of the meanings given above.

The carbyl and hydrocarbyl groups R$^{1-3}$ are preferably selected from straight-chain, branched or cyclic alkyl with 1 to 40, preferably 1 to 25 C-atoms, which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$=CY$^2$— or —C≡C— in such a manner that O and/or S atoms are not linked directly to one another, wherein Y$^1$ and Y$^2$ are independently of each other H, F, Cl or CN, and R$^0$ and R$^{00}$ are independently of each other H or an optionally substituted aliphatic or aromatic hydrocarbon with 1 to 20 C atoms.

Very preferably R$^1$ and R$^2$ are selected from, C$_1$-C$_{20}$-alkyl, C$_1$-C$_{20}$-oxaalkyl, C$_1$-C$_{20}$-alkoxy, C$_2$-C$_{20}$-alkenyl, C$_2$-C$_{20}$-alkynyl, C$_1$-C$_{20}$-thioalkyl, C$_1$-C$_{20}$-silyl, C$_1$-C$_{20}$-ester, C$_1$-C$_{20}$-amino, C$_1$-C$_{20}$-fluoroalkyl.

R$^3$ is preferably H or methyl.

An alkyl or alkoxy radical, i.e. where the terminal CH$_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more CH$_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are C$_2$-C$_7$-1E-alkenyl, C$_4$-C$_7$-3E-alkenyl, C$_5$-C$_7$-4-alkenyl, C$_6$-C$_7$-5-alkenyl and C$_7$-6-alkenyl, in particular C$_2$-C$_7$-1E-alkenyl, C$_4$-C$_7$-3E-alkenyl and C$_5$-C$_7$-4-alkenyl. Examples for particularly preferred alkenyl groups are vinyl, 1 E-propenyl, 1 E-butenyl, 1 E-pentenyl, 1 E-hexenyl, 1 E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one CH$_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl) ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more CH$_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)- butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

$R^0$ and $R^{00}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

$R^{1-3}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

The polymerizable group P is a group that is capable of participating in a polymerization reaction, like radical or ionic chain polymerization, polyaddition or polycondensation, or capable of being grafted, for example by condensation or addition, to a polymer backbone in a polymer analogous reaction. Especially preferred are polymerizable groups for chain polymerization reactions, like radical, cationic or anionic polymerization. Very preferred are polymerizable groups comprising a C—C double or triple bond, and polymerizable groups capable of polymerization by a ring-opening reaction, like oxetanes or epoxides.

Suitable and preferred polymerizable groups include, without limitation, $CH_2$=$CW^1$—COO—, $CH_2$=$CW^1$—CO—,

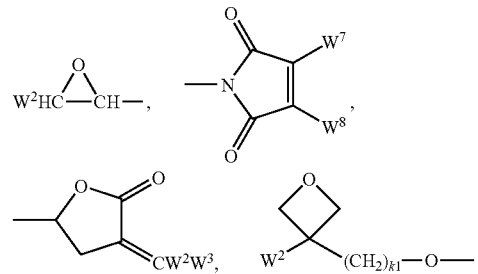

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, $CF_3$, phenyl or alkyl with 1 to 5 C-atoms, in particular H, F, $C_1$ or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerizable groups are selected from $CH_2$=$CW^1$—COO—, $CH_2$=$CW^1$—CO—,

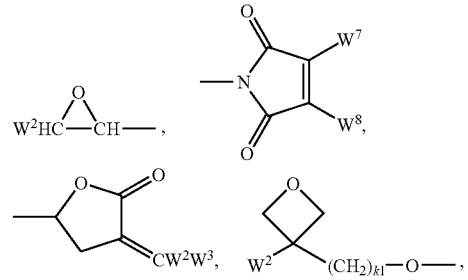

($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, $CF_3$, phenyl or alkyl with 1 to 5 C-atoms, in particular H, F, $C_1$ or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted preferably by one or more groups L as defined above (except for the meaning P-Sp-), and $k_1$ and $k_2$ being independently of each other 0 or 1.

Most preferred polymerizable groups are selected from $CH_2$=CH—COO—, $CH_2$=C($CH_3$)—COO—, $CH_2$=CF—COO—, ($CH_2$=CH)$_2$CH—OCO—, ($CH_2$=CH)$_2$CH—O—,

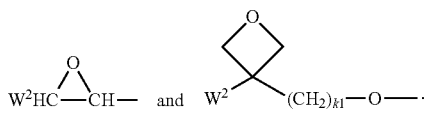

Polymerization can be carried out according to methods that are known to the ordinary expert and described in the literature, for example in D. J. Broer; G. Challa; G. N. Mol, *Macromol. Chem.*, 1991, 192, 59.

The spacer group Sp is preferably selected of formula Sp'-X', such that P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —COO—O—, —S—CO—, —CO—S—, —$NR^0$—CO—O—, —O—CO—$NR^0$—, —$NR^0$—CO—$NR^0$—, —CH═CH— or —C≡C— in such a manner that O and/or S atoms are not linked directly to one another, X' is —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^1$═$CY^2$—, —C≡C—, —CH═CH—COO—, —OCO—CH═CH— or a single bond, $R^0$ and $R^{00}$ are independently of each other H or alkyl with 1 to 12 C-atoms, and $Y^1$ and $Y^2$ are independently of each other H, F, Cl or CN.

X' is preferably —O—, —S —CO—, —COO—, —OCO—, —O—COO—, —CO—$NR^0$—, —$NR^0$—CO—, —$NR^0$—CO—$NR^0$— or a single bond.

Typical groups Sp' are, for example, —$(CH_2)_{p1}$—, —$(CH_2CH_2O)_{q1}$— —$CH_2CH_2$—, —$CH_2CH_2$—S—$CH_2CH_2$— or —$CH_2CH_2$—NH—$CH_2CH_2$— or —$(SiR^0R^{00}$—O$)_{p1}$—, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups.

Further preferred are compounds wherein the polymerizable group is directly attached to the mesogenic group without a spacer group Sp.

In case of compounds with two or more groups P-Sp-, the polymerizable groups P and the spacer groups Sp can be identical or different.

In another preferred embodiment the calamitic compounds comprise one or more terminal groups $R^{1,2}$ or substituents L or $R^3$ that are substituted by two or more polymerizable groups P or P-Sp- (multifunctional polymerizable groups). Suitable multifunctional polymerizable groups of this type are disclosed for example in U.S. Pat. No. 7,060,200 B1 oder US 2006/0172090 A1. Very preferred are compounds comprising one or more multifunctional polymerizable groups selected from the following formulae:

| | |
|---|---|
| —X-alkyl-$CHP^1$—$CH_2$—$CH_2P^2$ | P1 |
| —X'-alkyl-C($CH_2P^1$)($CH_2P^2$)—$CH_2P^3$ | P2 |
| —X'-alkyl-$CHP^1CHP^2$—$CH_2P^3$ | P3 |
| —X'-alkyl-C($CH_2P^1$)($CH_2P^2$)—$C_{aa}H_{2aa+1}$ | P4 |
| —X'-alkyl-$CHP^1$—$CH_2P^2$ | P5 |
| —X'-alkyl-$CHP^1P^2$ | P5 |
| —X'-alkyl-$CP^1P^2$—$C_{aa}H_{2aa+1}$ | P6 |
| —X'-alkyl-C($CH_2P^1$)($CH_2P^2$)—$CH_2OCH_2$—C($CH_2P^3$)($CH_2P^4$)$CH_2P^5$ | P7 |
| —X'-alkyl-CH(($CH_2)_{aa}P^1$)(($CH_2)_{bb}P^2$) | P8 |
| —X'-alkyl-$CHP^1CHP^2$—$C_{aa}H_{2aa+1}$ | P9 | wherein alkyl is straight-chain or branched alkylene having 1 to 12 C-atoms which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —O—CO—O—, —S—CO—, —CO—S—, —$SO_2$—, —CO—$NR^0$—, —$NR^0$—CO—, —$NR^0$—CO—$NR^{00}$—, —$CY^1$═$CY^2$— or —C≡C— in such a manner that O and/or S atoms are not linked directly to one another, with $R^0$ and $R^{00}$ having the meanings given above, or denotes a single bond, aa and bb are independently of each other 0, 1, 2, 3, 4, 5 or 6, X' is as defined above, and $P^{1-5}$ independently of each other have one of the meanings given for P above.

Very preferred compounds of formula I are those of the following subformulae:

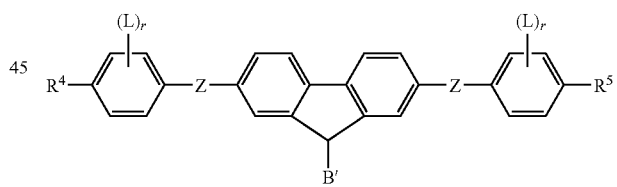

Ia

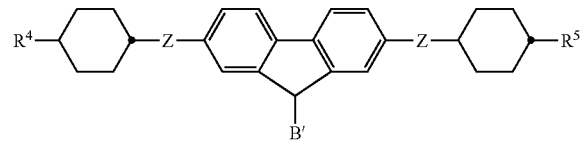

Ib wherein B', L and r are as defined above, $R^4$ and $R^5$ have independently of each other one of the meanings of $R^1$ given above, and Z has one of the meanings of $Z^1$ given above. Preferably one or both of $R^4$ and $R^5$ denote P- or P-Sp-. B' is preferably $(B)_q$—H, with B and q being as defined above. Z is preferably —COO—, —OCO— or a single bond.

Very preferred compounds of formula II are those of the following subformulae:

IIa

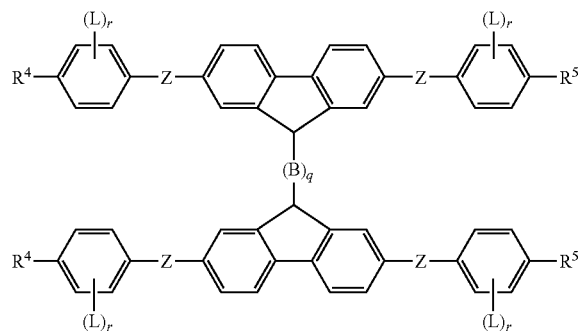

IIb

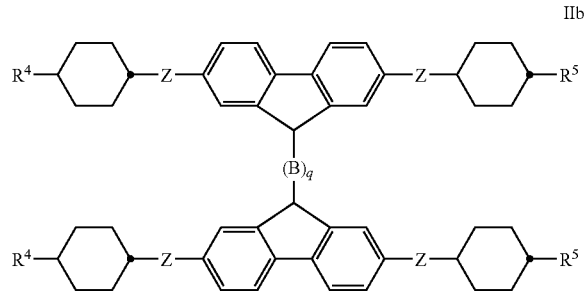

wherein B and q are as defined above, $R^4$ and $R^5$ have independently of each other one of the meanings of $R^1$ given above, and Z has in each occurrence independently of one another one of the meanings of $Z^1$ given above. Preferably one or more, very preferably all of $R^4$ and $R^5$ denote P- or P-Sp-. Z is preferably —COO—, —OCO— or a single bond.

Especially preferred are compounds of the following sub-formulae:

Ia1

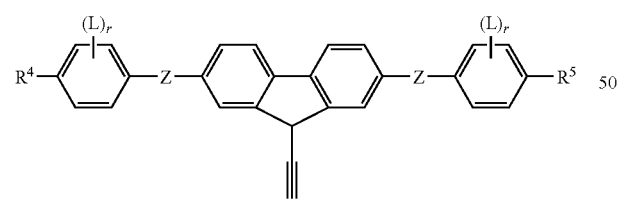

Ib1

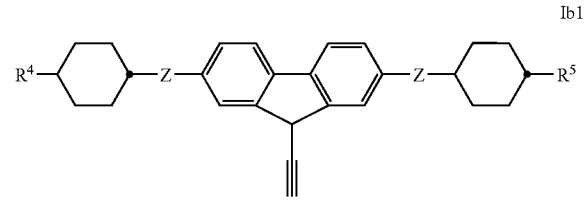

Ia2

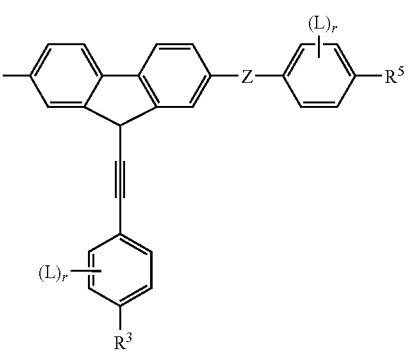

Ib2

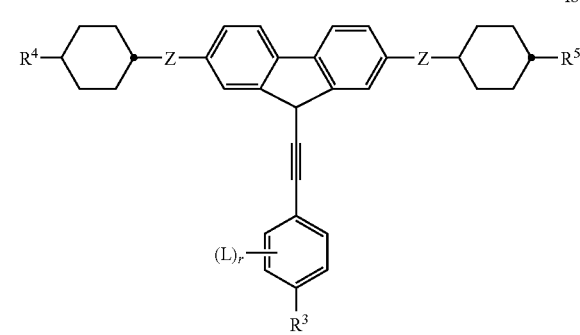

Ia3

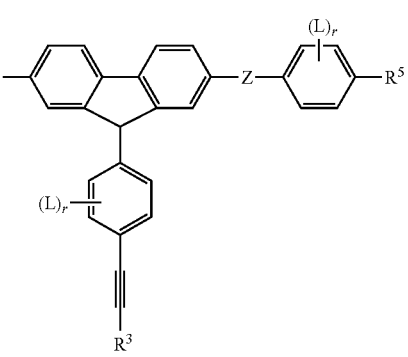

Ib3

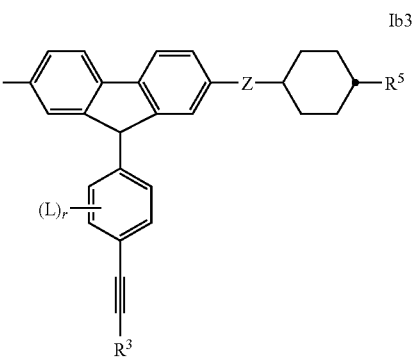

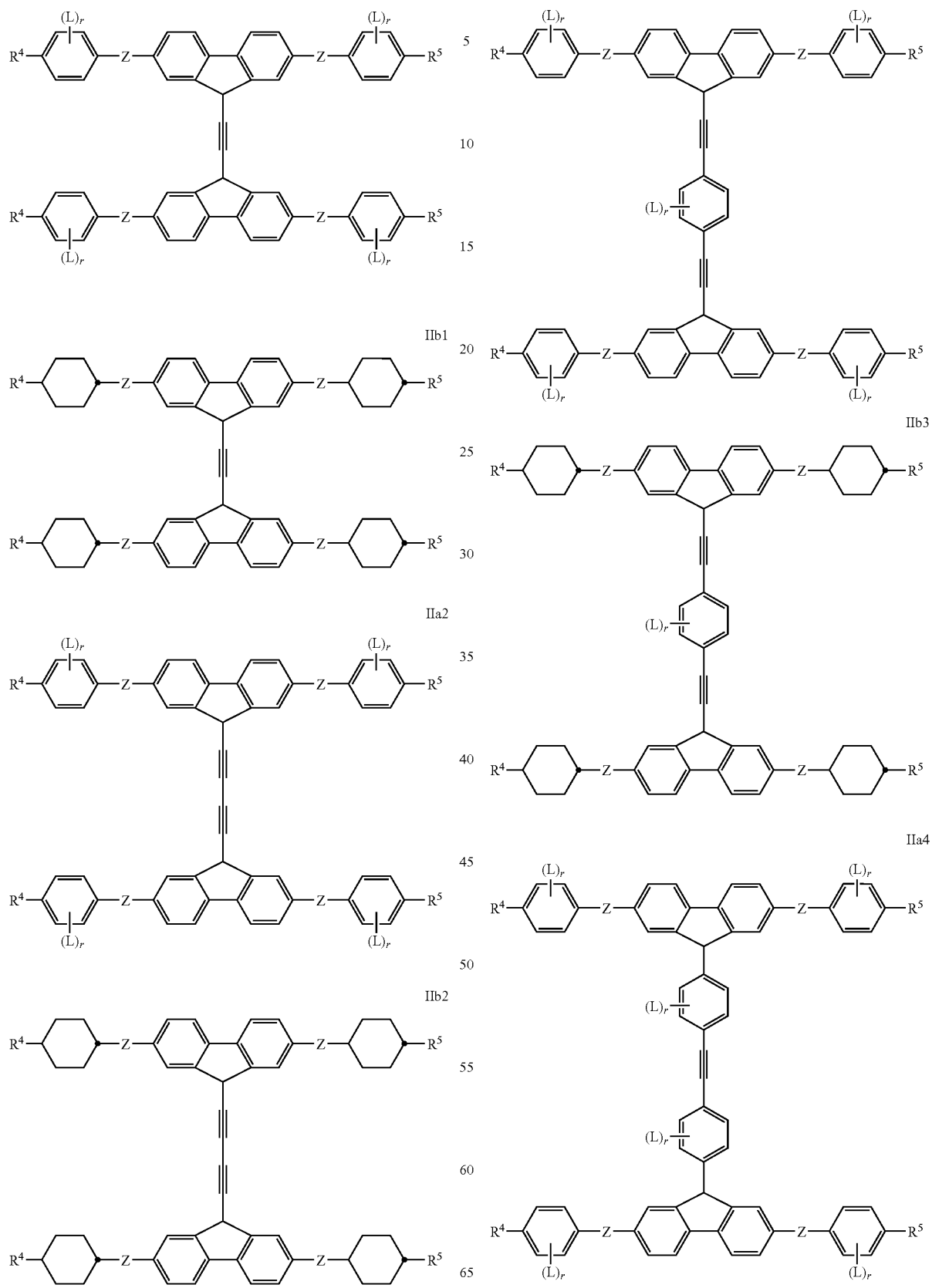

-continued

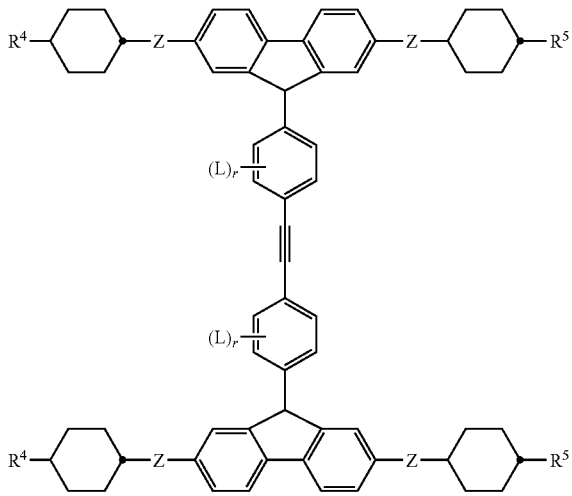

IIb4 wherein $R^3$, $R^4$, $R^5$, Z, L and r are as defined above, and preferably all of $R^4$ and $R^5$ denote P or P-Sp-, and preferably Z is —COO— or —OCO—.

P-Sp- in these preferred compounds is preferably P-Sp'-X', with X' preferably being —O—, —COO— or —OCOO—. Z is preferably —COO—, —OCO— or a single bond.

The compounds of the present invention can be synthesized according to or in analogy to methods which are known per se and which are described in the literature and in standard works of organic chemistry such as, for example, Houben-Weyl, Methoden der organischen Chemie, Thieme-Verlag, Stuttgart. Especially suitable and preferred methods of synthesis are described below and in the examples.

The compounds of formula I and II can be generally synthesized by reacting an alcohol protected 2,7-dihydroxyfluoren-9-one with a protected acetylene to give the ethynyl-alcohol. The hydroxyl group can be removed by treatment with triethylsilane. The lateral acetylene intermediates can react with aryl halides under Sonogahira conditions to give either the compounds disclosed in formula I or with a dihaloaromatic intermediate to give the compounds disclosed in formula II.

The methods of preparing a calamitic compound as described above and below are another aspect of the invention.

Especially preferred is a method comprising the following steps:
a) the alcohol protected 2,7-dihydroxyfluoren-9-one is reacted with a protected acetylene, e.g. 1-(trialkylsilyl)acetylene, preferably 1-(trimethylsilyl)acetylene, and n-butyl lithium to give the alcohol-acetylene intermediate,
b) the above intermediate is reduced using triethylsilane, e.g. as in Tetrahedron Letters, Vol. 38, No. 6, pp. 1013-1016, 1997, to give a lateral acetylene compound,
c) this lateral acetylene compound is converted to a lateral phenylacetylene via a coupling reaction with an arylhalide or with a dihaloaromatic intermediate, preferably under Sonogashira conditions, or is converted into a dimer by homocoupling (i.e. coupling two lateral acetylene molecules from step b).

Another aspect of the invention is a polymerizable formulation, preferably a polymerizable LC formulation, comprising one or more guest compounds as described above and below, and one or more additional compounds, which are preferably mesogenic or liquid crystalline and/or polymerizable. Very preferably the LC formulation comprises one or more additional compounds selected from reactive mesogens (RMs), most preferably selected from mono- and direactive RMs. These additional compounds constitute the polymerizable LC host component.

Preferably the polymer films according to the present invention are crosslinked, and the polymerizable guest compounds and/or the polymerizable host components comprise at least one compound with two or more polymerizable groups (di- or multireactive).

The concentration of the guest compound(s) of the present invention in the polymerizable LC formulation (including both the guest and host component) is preferably from 5 to 90 wt. %, very preferably from 30 to 70 wt. %.

The additional RMs of the polymerizable LC host formulation can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list.

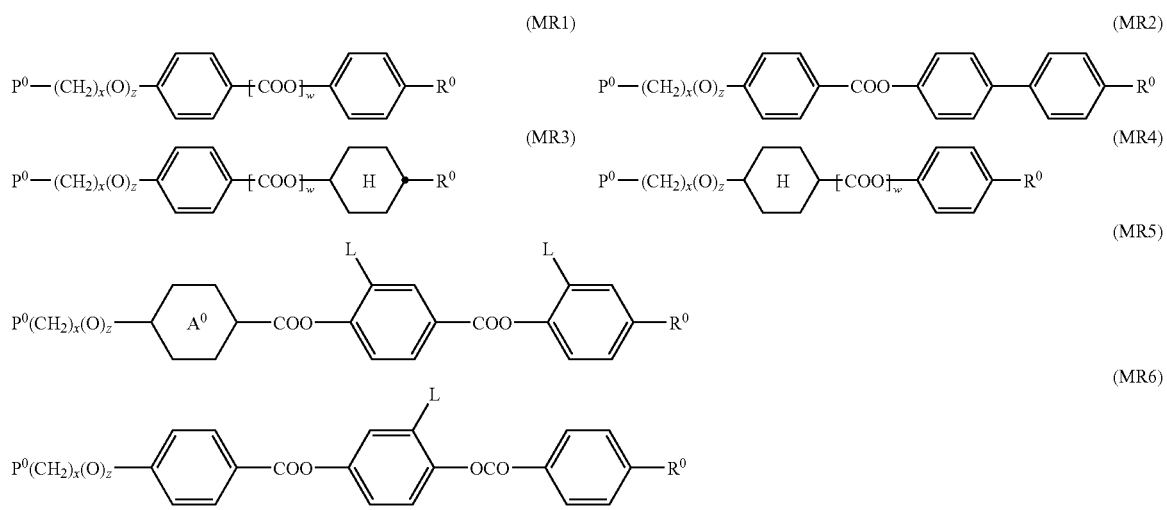

(MR7)
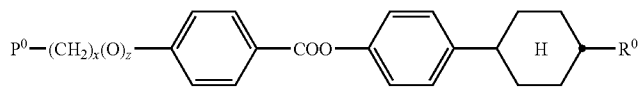
(MR8)
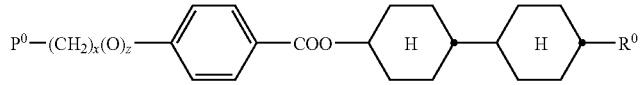
(MR9)
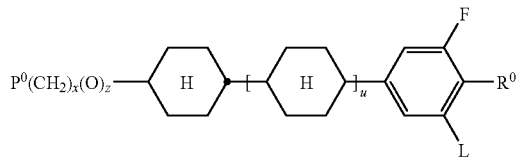
(MR10)
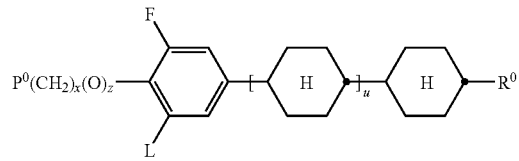
(MR11)
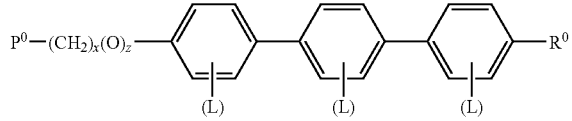
(MR12)
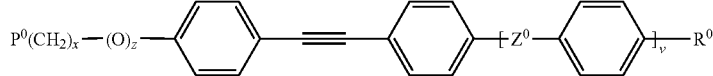
(MR13)
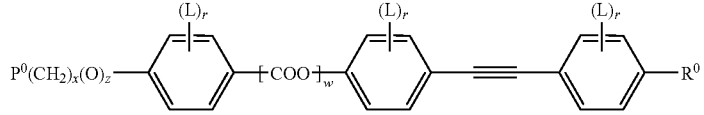
(MR14)
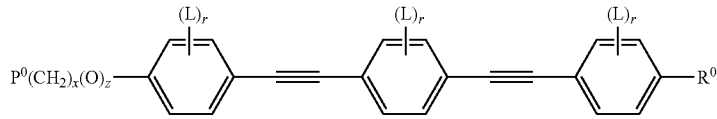
(MR15)
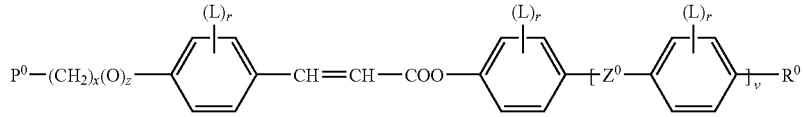
(MR16)
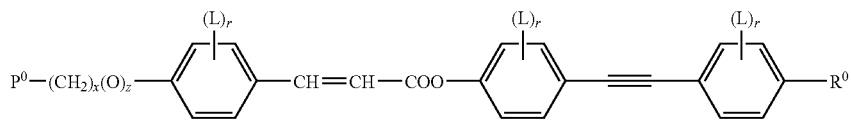
(MR17)
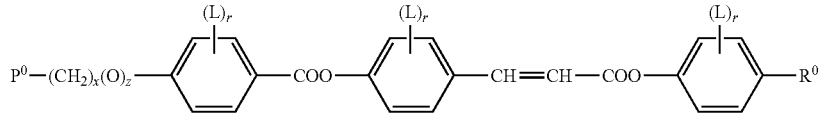
(MR18)
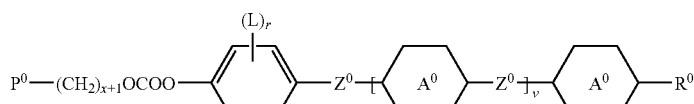
(MR19)
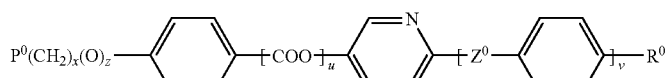
(MR20)
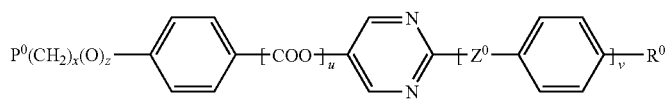

-continued
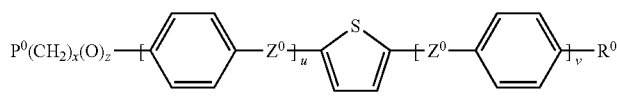
(MR21)
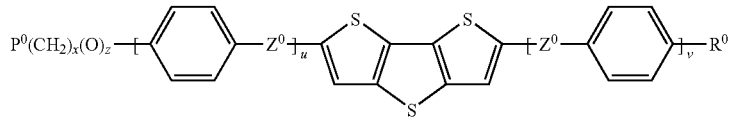
(MR22)
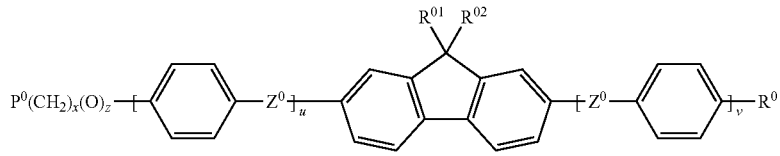
(MR23)
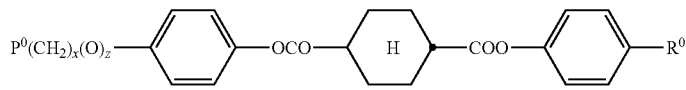
(MR24)
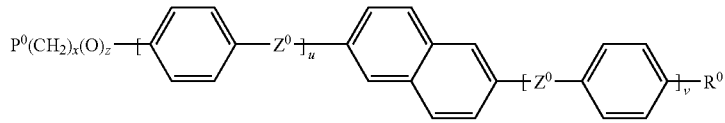
(MR25)
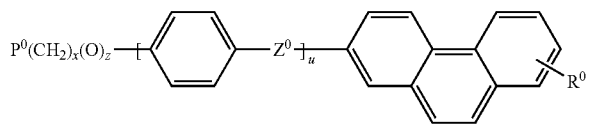
(MR26)
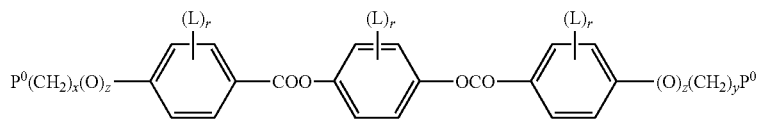
(DR1)
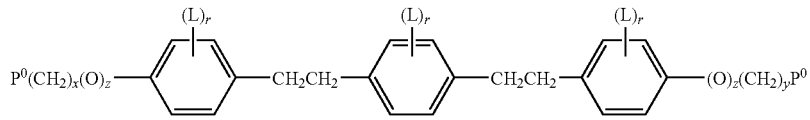
(DR2)
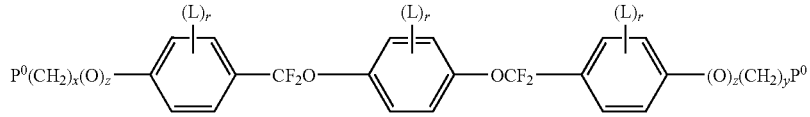
(DR3)
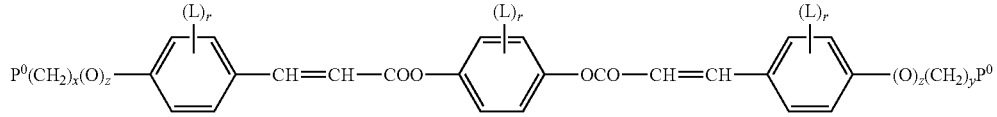
(DR4)
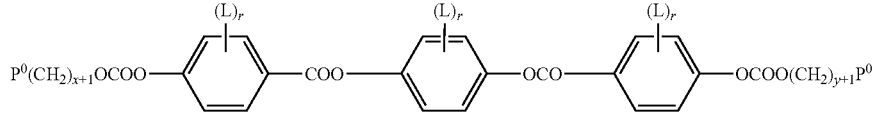
(DR5)
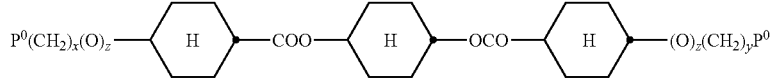
(DR6)
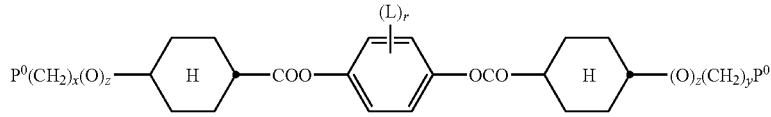
(DR7)

(DR8)
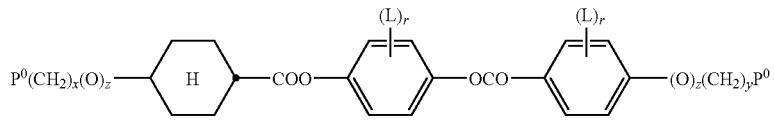
(DR9)
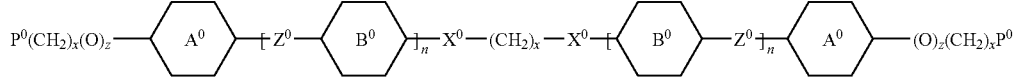
(CR1)
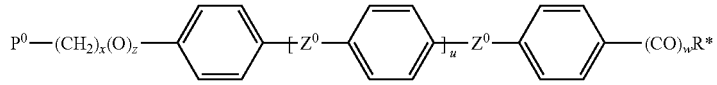
(CR2)
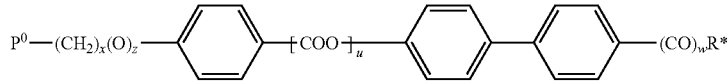
(CR3)
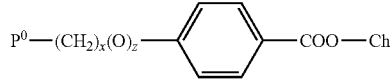
(CR4)
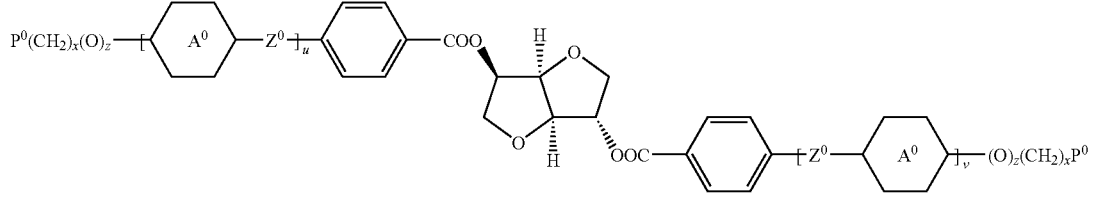
(CR5)
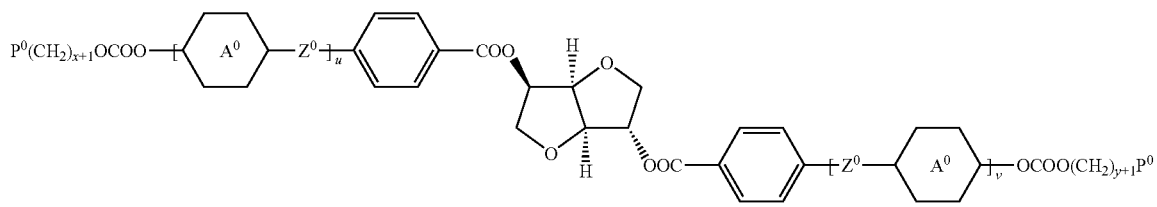
(CR6)
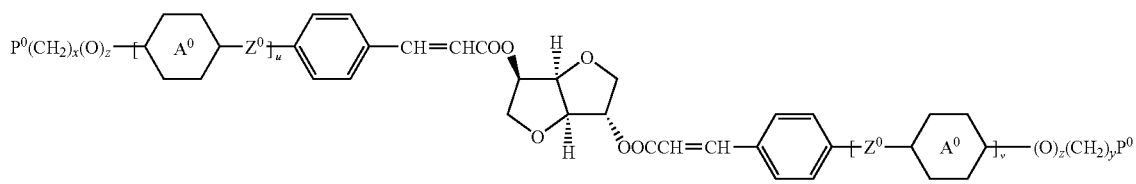
(CR7)
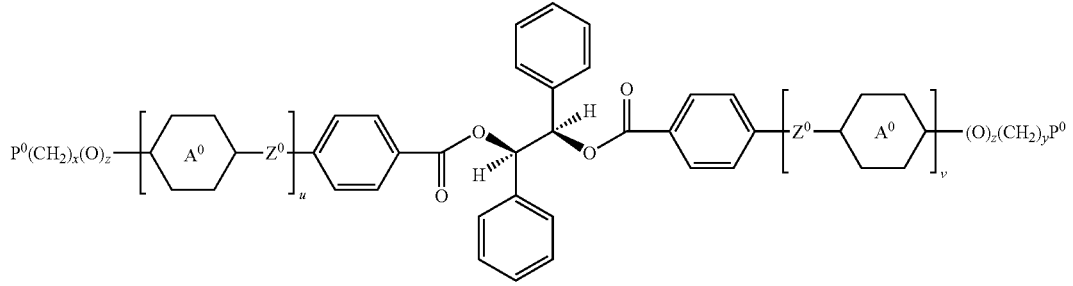

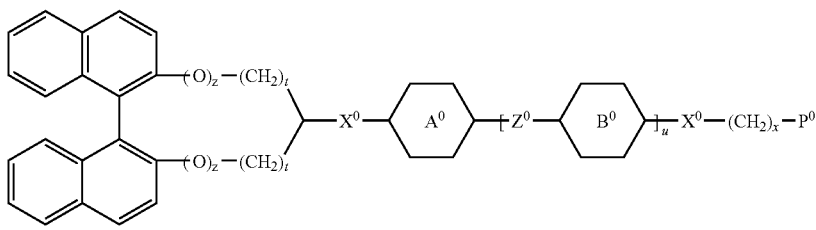

(CR8)

wherein
P⁰ is, in case of multiple occurrence independently of one another, a polymerizable group, preferably an acryl, methacryl, oxetane, epoxy, vinyl, vinyloxy, propenyl ether or styrene group,
A⁰ and B⁰ are, in case of multiple occurrence independently of one another, 1,4-phenylene that is optionally substituted with 1, 2, 3 or 4 groups L, or trans-1,4-cyclohexylene,
Z⁰ is, in case of multiple occurrence independently of one another, —COO—, —OCO—, —CH$_2$CH$_2$—, —C≡C—, —CH=CH—, —CH=CH—COO—, —OCO—CH=CH— or a single bond,
R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is Y⁰ or P—(CH$_2$)$_y$—(O)$_z$—,
Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms,
R$^{o1,o2}$ are independently of each other H, R⁰ or Y⁰,
R* is a chiral alkyl or alkoxy group with 4 or more, preferably 4 to 12 C atoms, like 2-methylbutyl, 2-methyloctyl, 2-methylbutoxy or 2-methyloctoxy,
Ch is a chiral group selected from cholesteryl, estradiol, or terpenoid radicals like menthyl or citronellyl,
L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0,
and wherein the benzene and napthalene rings can additionally be substituted with one or more identical or different groups L.

Especially preferably the polymerizable LC host component contains only achiral compounds and no chiral compounds.

Further preferably the polymerizable LC host component comprises one or more compounds selectred from formula MR3, MR4, MR7, MR8, MR9, MR10, MR18, DR6, DR7 and DR8, furthermore DR1 and DR5.

Further preferably the polymerizable LC host component comprises one or more compounds selected from the following formulae:

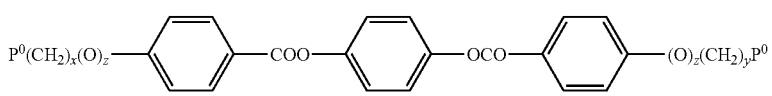

(DR1a)

(DR6)

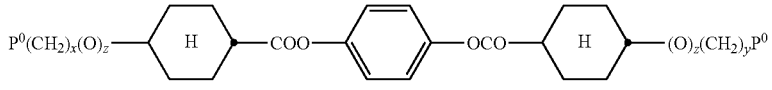

(DR7a)

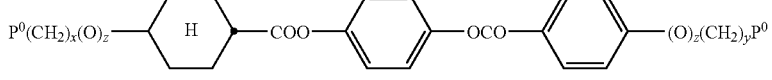

(DR8a)

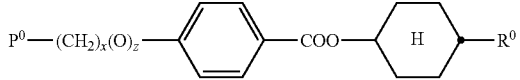

(MR3a)

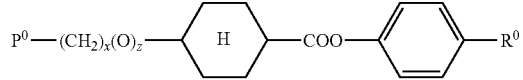

(MR4a)

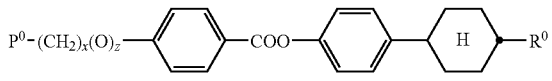

(MR7)

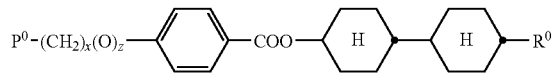

(MR8)

-continued
(MR9a)
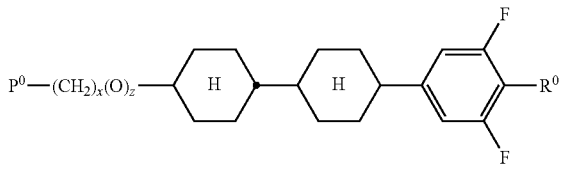
(MR10a)
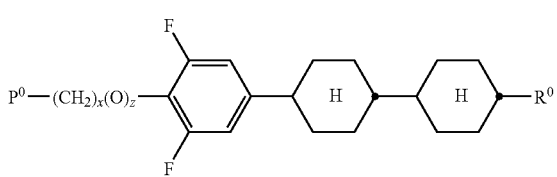
wherein P⁰, R⁰, x, y, and z are as defined above.
Further preferably the polymerizable LC host component comprises one or more compounds selected from the following formulae:
(DR1a1)
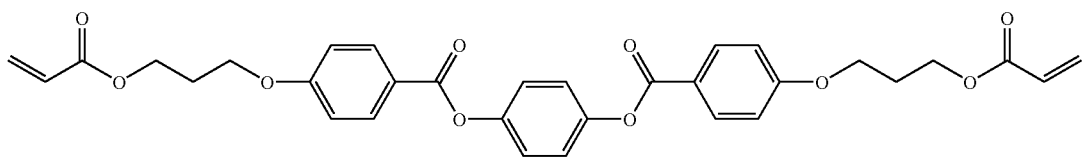
(DR1a2)
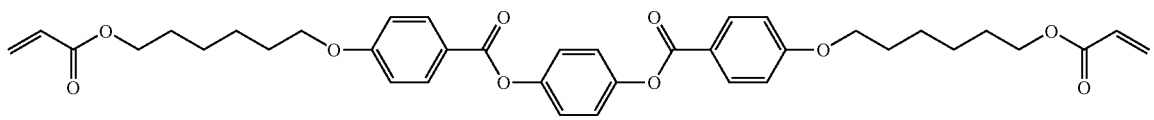
(DR6a)
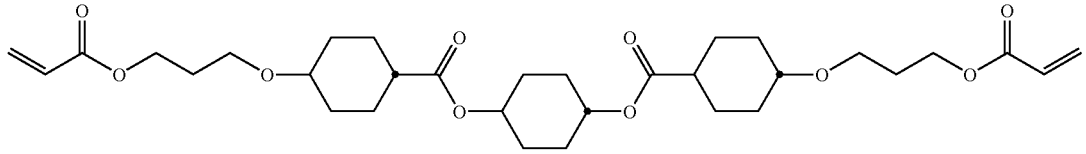
(DR6b)
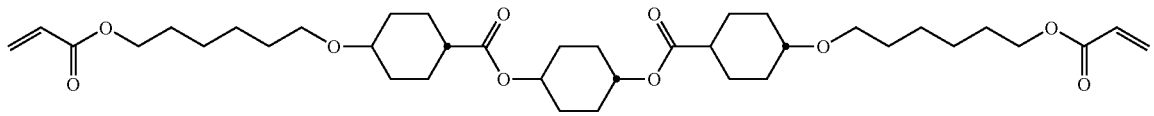
(DR7a1)
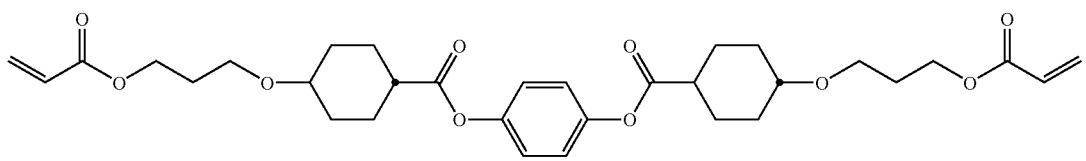
(DR7a2)
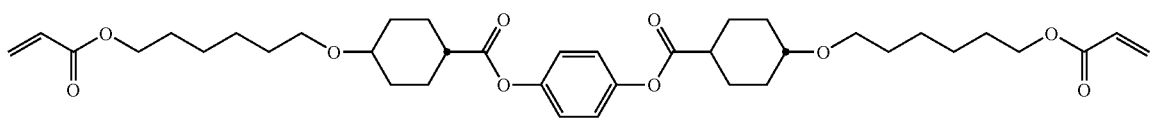
(DR8a1)
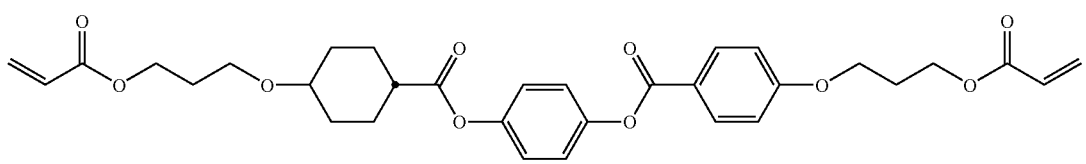

-continued
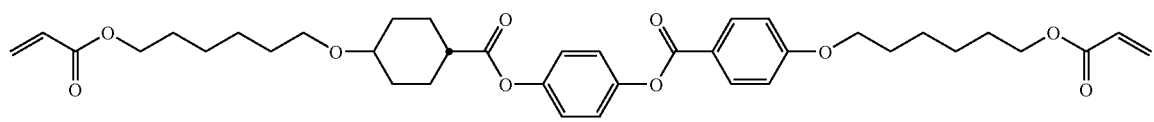
(DR8a2)
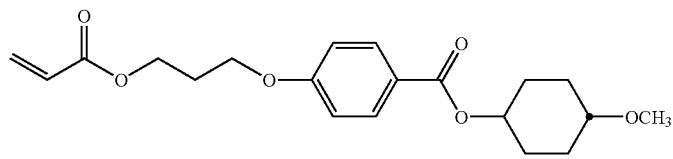
(MR3a1)
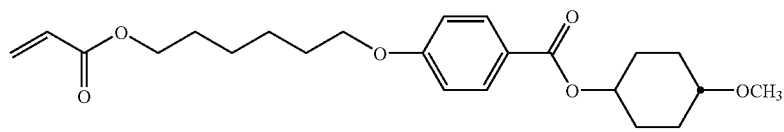
(MR3a2)
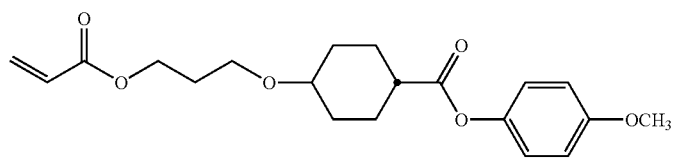
(MR4a1)
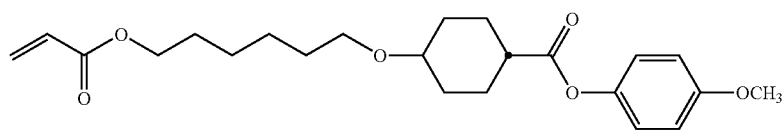
(MR4a2)
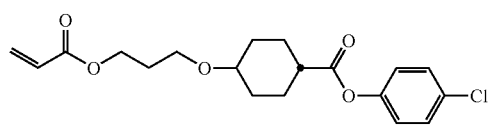
(MR4a3)
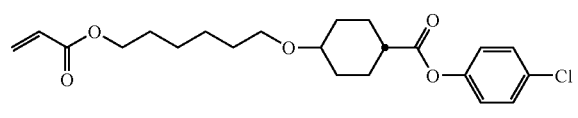
(MR4a4)
(MR7a)
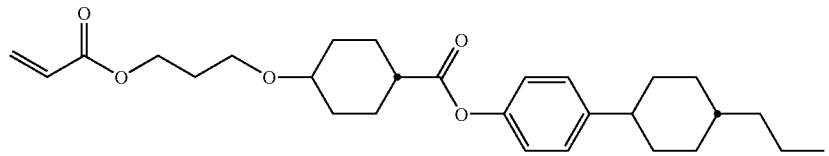
(MR7b)
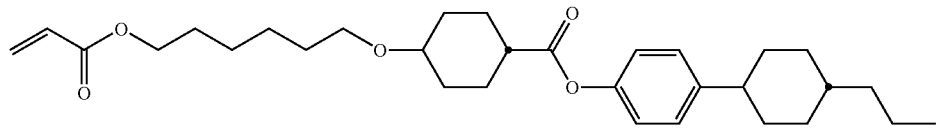
(MR9a1)
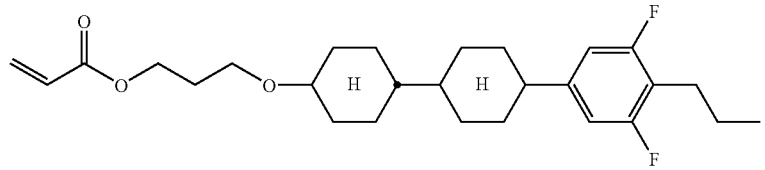
(MR9a2)
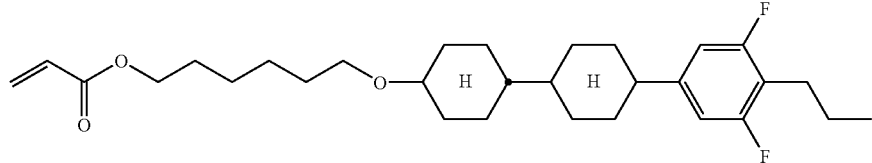

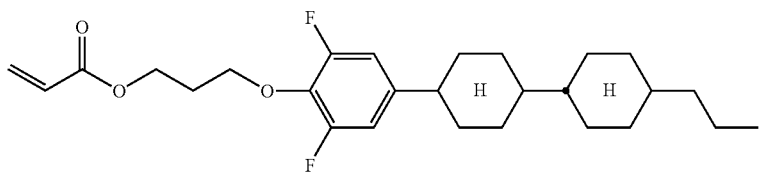

(MR10a1)

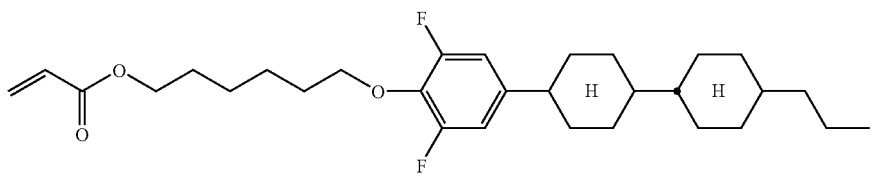

(MR10a2)

Preferably the polymerizable compounds of the polymerizable LC host component are selected from compounds, very preferably mono- or direactive RMs, having low birefringence.

Especially preferred is a polymerizable host component having an absolute value of the birefringence from 0.01 to 0.2, very preferably from 0.04 to 0.16.

The general preparation of polymer LC films according to this invention is known to the ordinary expert and described in the literature, for example in D. J. Broer; G. Challa; G. N. Mol, *Macromol. Chem.*, 1991, 192, 59. Typically a polymerizable LC material (i.e. a compound or a mixture or formulation) is coated or otherwise applied onto a substrate where it aligns into uniform orientation, and polymerized in situ in its LC phase at a selected temperature for example by exposure to heat or actinic radiation, preferably by photo-polymerization, very preferably by UV-photopolymerization, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerizable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable material in a suitable solvent. This solution is then coated or printed onto the substrate, for example by spin-coating or printing or other known techniques, and the solvent is evaporated off before polymerization. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Initial alignment (e.g. planar alignment) of the polymerizable LC material can be achieved for example by rubbing treatment of the substrate, by shearing the material during or after coating, by annealing the material before polymerization, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerizable material comprising one or more surfactants that promote a specific surface alignment of the LC molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerizable surfactants as described in EP 1 256 617.

It is also possible to apply an alignment layer onto the substrate and provide the polymerizable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

It is also possible to induce or improve alignment by annealing the polymerizable LC material at elevated temperature, preferably at its polymerization temperature, prior to polymerization.

Polymerization is achieved for example by exposing the polymerizable material to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerization is preferably carried out in the presence of an initiator absorbing at the wavelength of the actinic radiation. For this purpose the polymerizable LC material preferably comprises one or more initiators, preferably in a concentration from 0.01 to 10%, very preferably from 0.05 to 5%. For example, when polymerizing by means of UV light, a photoinitiator can be used that decomposes under UV irradiation to produce free radicals or ions that start the polymerization reaction. For polymerizing acrylate or methacrylate groups preferably a radical photoinitiator is used. For polymerizing vinyl, epoxide or oxetane groups preferably a cationic photoinitiator is used. It is also possible to use a thermal polymerization initiator that decomposes when heated to produce free radicals or ions that start the polymerization. Typical radical photoinitiators are for example the commercially available Irgacure® or Darocure® (Ciba Geigy AG, Basel, Switzerland). A typical cationic photoinitiator is for example UVI 6974 (Union Carbide).

The polymerizable material may also comprise one or more stabilizers or inhibitors to prevent undesired spontaneous polymerization, like for example the commercially available Irganox® (Ciba Geigy AG, Basel, Switzerland).

The curing time depends, inter alia, on the reactivity of the polymerizable material, the thickness of the coated layer, the type of polymerization initiator and the power of the UV lamp. The curing time is preferably ≦5 minutes, very preferably ≦3 minutes, most preferably ≦1 minute. For mass production short curing times of ≦30 seconds are preferred.

Preferably polymerization is carried out in an inert gas atmosphere like nitrogen or argon.

The polymerizable material may also comprise one or more dyes having an absorption maximum adjusted to the wavelength of the radiation used for polymerization, in particular UV dyes like e.g. 4,4"-azoxy anisole or Tinuvin® dyes (from Ciba AG, Basel, Switzerland).

In another preferred embodiment the polymerizable material comprises one or more monoreactive polymerizable non-mesogenic compounds, preferably in an amount of 0 to 50%, very preferably 0 to 20%. Typical examples are alkylacrylates or alkylmethacrylates.

In another preferred embodiment the polymerizable material comprises one or more di- or multireactive polymerizable non-mesogenic compounds, preferably in an amount of 0 to 50%, very preferably 0 to 20%, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerizable material in order to modify the physical properties of the polymer film. Especially preferred are thiol compounds, for example monofunctional thiols like dodecane thiol or multifunctional thiols like trimethylpropane tri (3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerizable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerizable material does not contain a binder or dispersion auxiliary.

The polymerizable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

The polymer films and materials of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell (π-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensation film for viewing angle enhancement of LCD's or as a component in a brightness enhancement films, furthermore as an achromatic element in reflective or transflective LCD's. Further preferred applications and devices include
- retarding components in optoelectronic devices requiring similar phase shift at multiple wavelengths, such as combined CD/DVD/HD-DVD/Blu-Ray, including reading, writing re-writing data storage systems
- achromatic retarders for optical devices such as cameras
- achromatic retarders for displays including OLED and LCD's.

The following examples are intended to explain the invention without restricting it. The methods, structures and properties described hereinafter can also be applied or transferred to materials that are claimed in this invention but not explicitly described in the foregoing specification or in the examples.

Above and below, percentages are percent by weight. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. Δn denotes the optical anisotropy ($\Delta n=n_e-n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise.

In the description and claims of this specification, unless stated otherwise the retardation and dispersion are determined by the methods as described above.

Unless stated otherwise, the percentages of components of a polymerizable mixture as given above and below refer to the total amount of solids in the mixture polymerizable mixture, i.e. not including solvents.

EXAMPLE 1

Compound 3.7 is prepared via the route shown in Scheme 1.

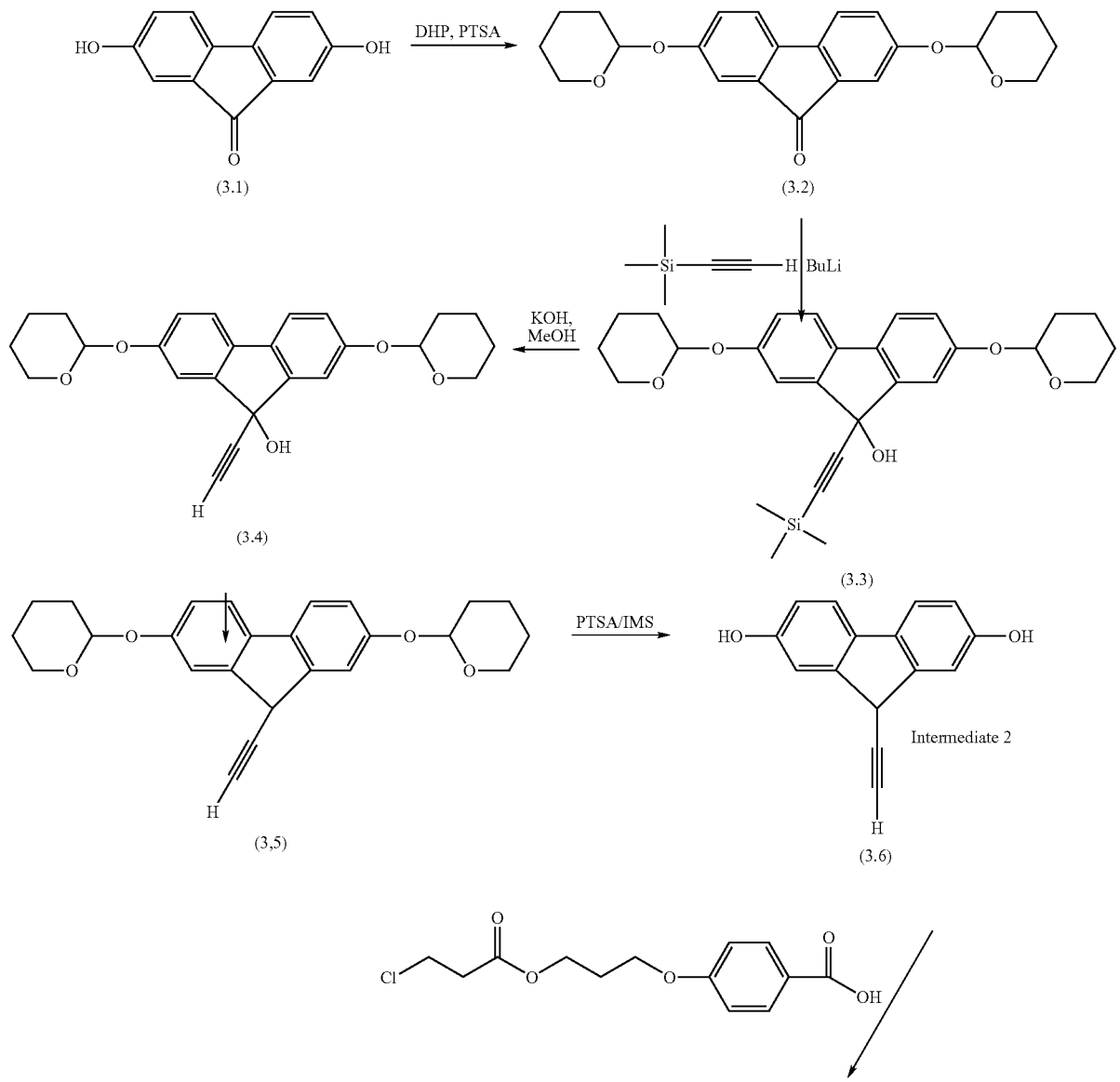

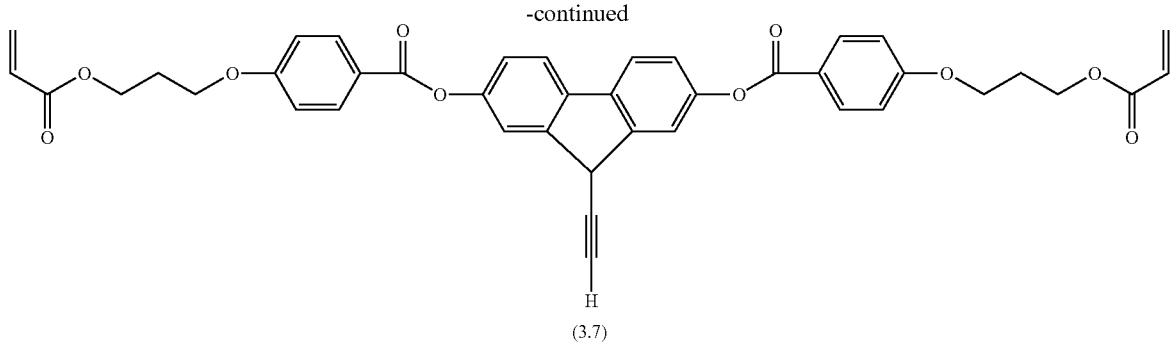

(3.7)

The starting material 2,7-dihydroxyfluorene-9-one (3.1) is firstly protected with THP groups and subsequently reacted with trimethylsilylacetylene and BuLi to give the adduct (3.3). Removal of the trimethylsilyl groups, reduction of the tertiary alcohol (3.4), and removal of the THP protecting groups gives the useful intermediate (3.8). Reaction of this dialcohol with 4-[3-(3-chloro-1-oxopropoxy)propoxy]-benzoic acid gives, after removal of HCl from the chloropropionate group, the target product (3.7).

EXAMPLE 2

Compound (4.1) is prepared using compound (3.7) from Example 1 as shown in Scheme 2.

Scheme 2:

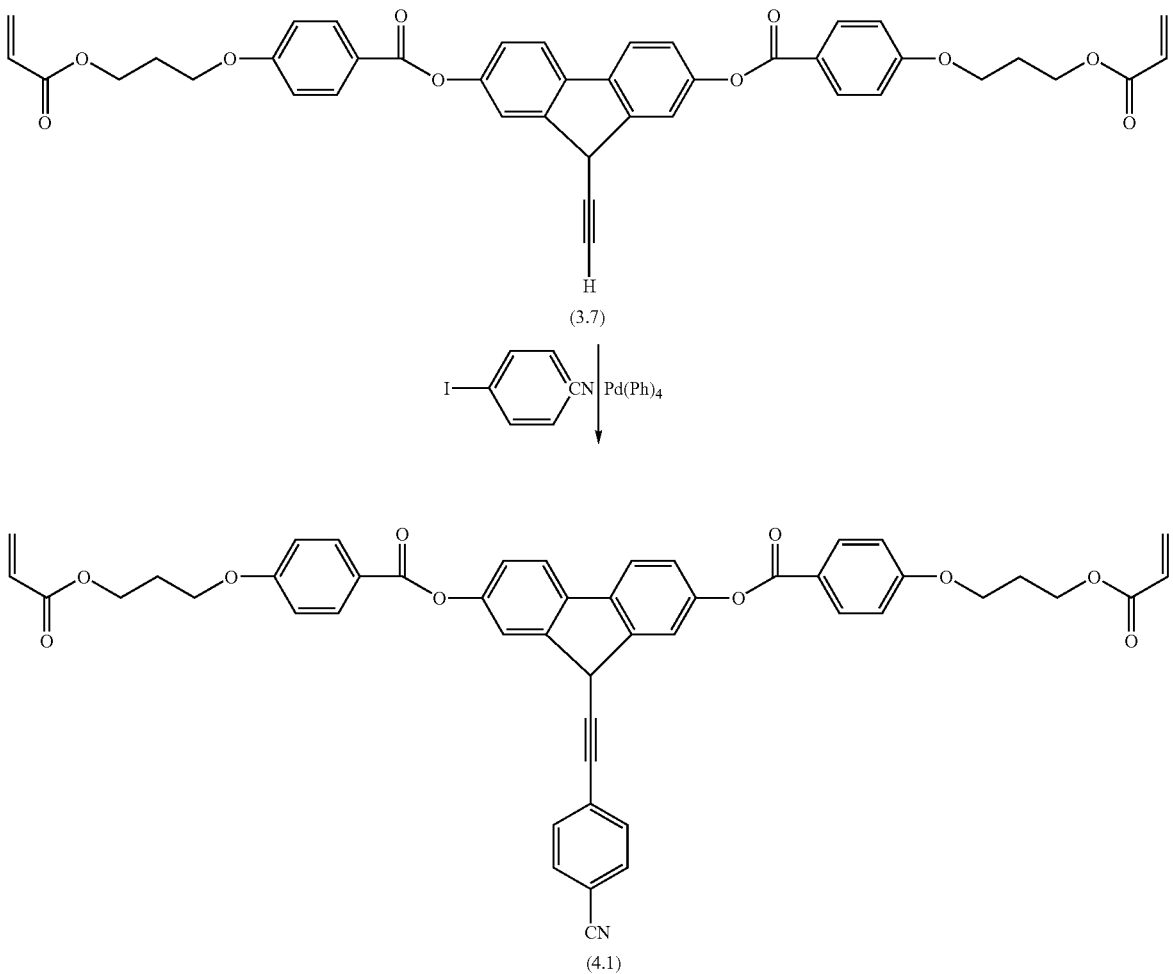

EXAMPLE 3
Compound (5.1) is prepared using compound (3.7) from Example 1 as shown in Scheme 2.
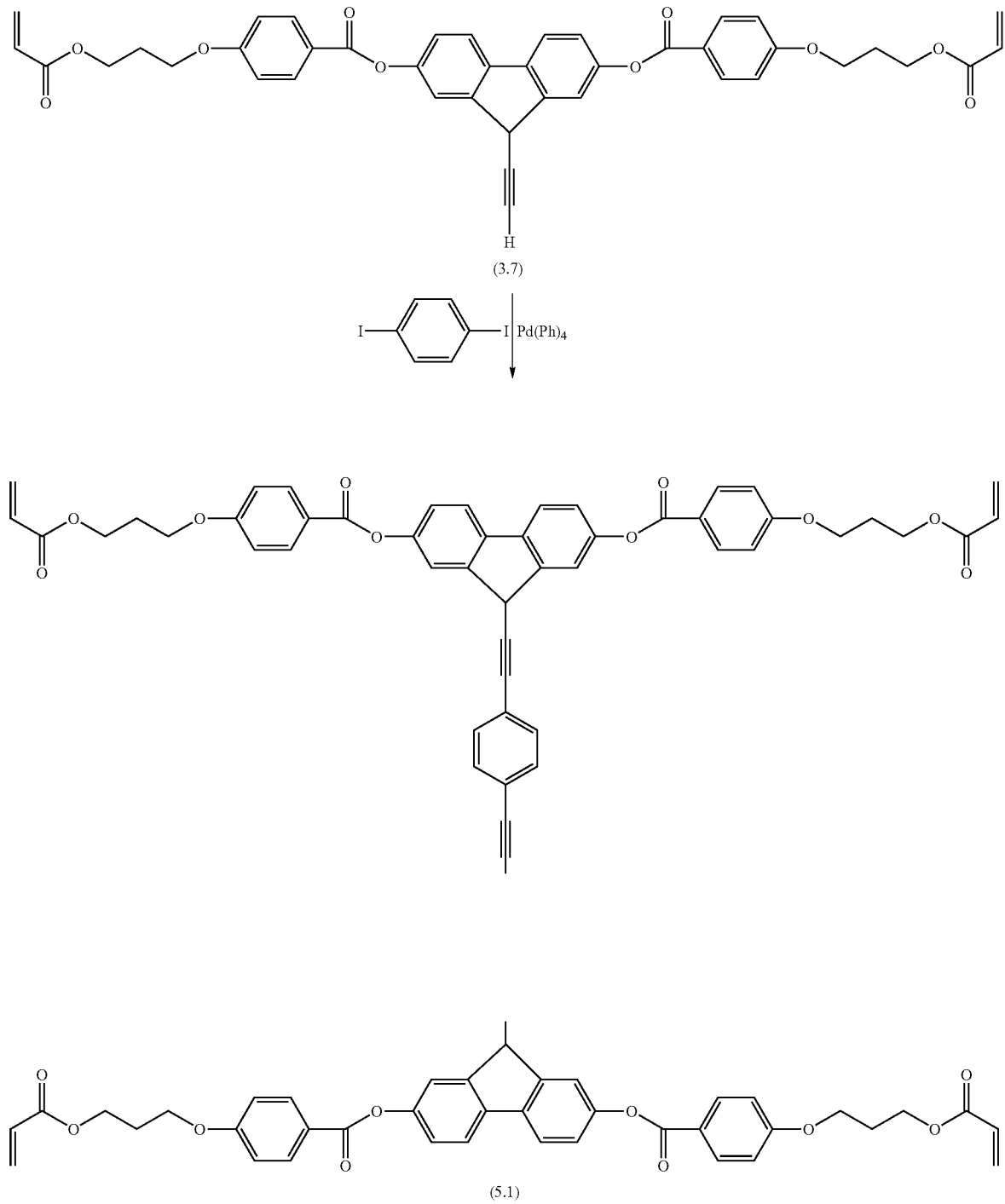

EXAMPLE 4
Compound (6.3) is prepared using intermediate (3.6) from Example 1 as shown in Scheme 4.
Scheme 4:
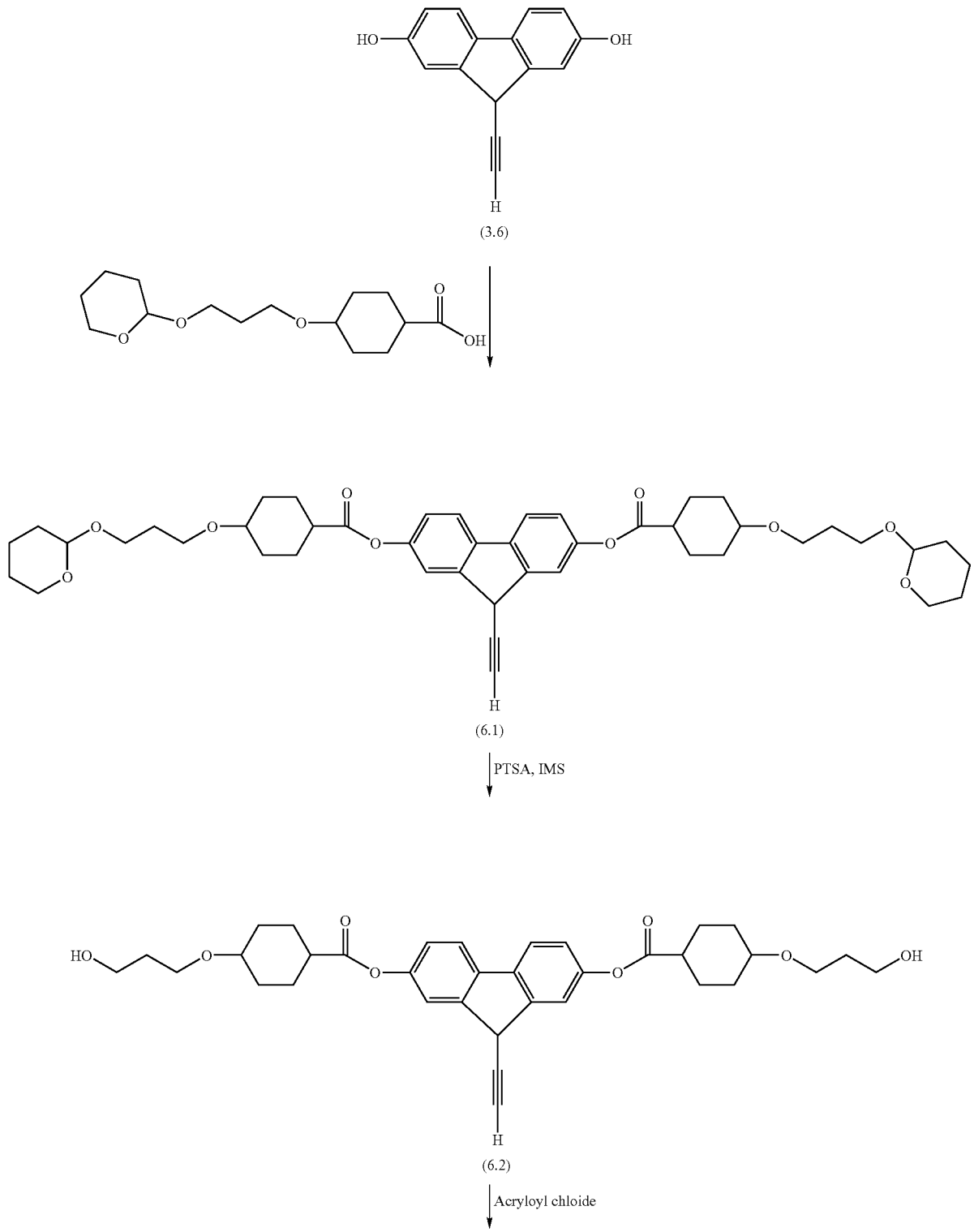

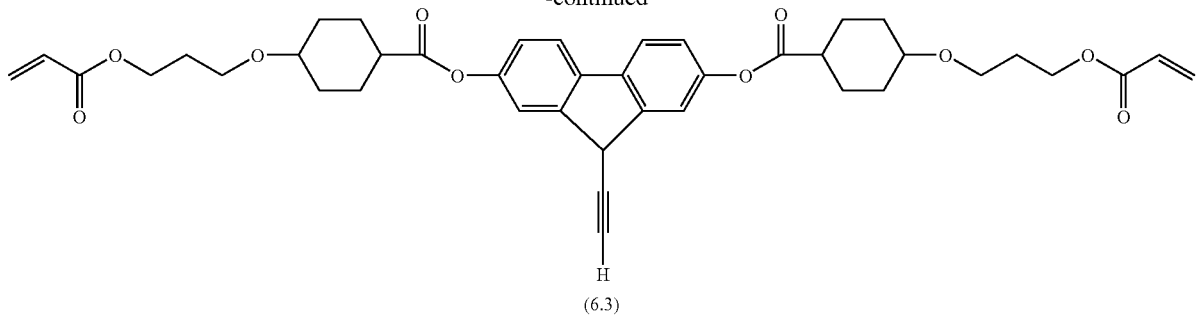
(6.3)
In this case the saturated acid, trans-4-[6-(Tetrahydropyran-2-yloxy)hexyloxy]cyclohexane-carboxylic acid (2.1) is used to esterify with the dialcohol (3.6).
EXAMPLE 5
Compound (7.1) is prepared using intermediate (6.3) from Example 4 as shown in Scheme 5.
Scheme 5:
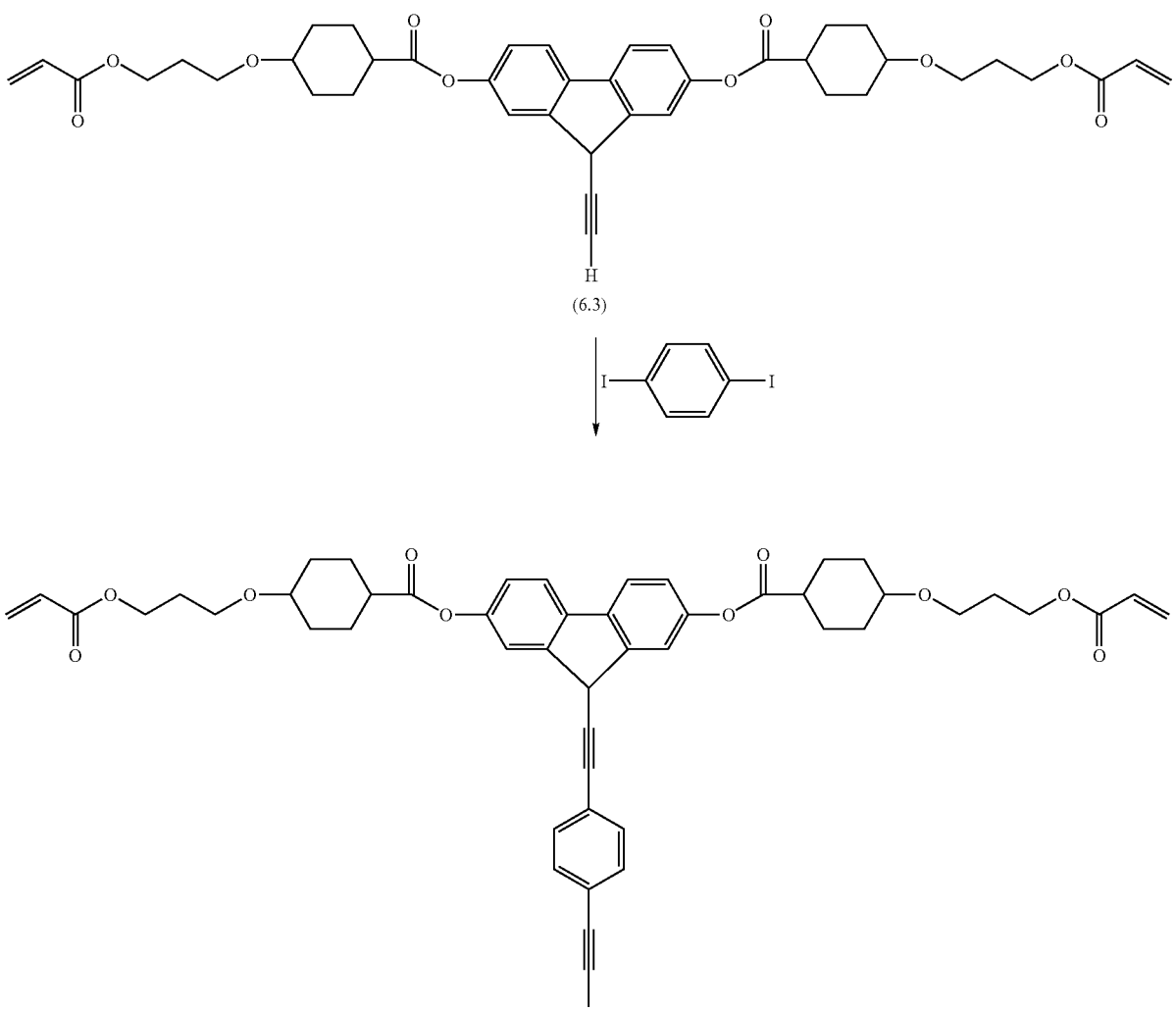

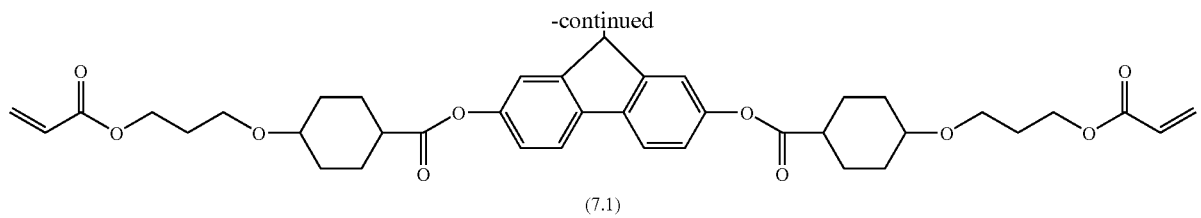

(7.1)

EXAMPLE 6

Compound (8.5) is prepared as shown in Scheme 6. The half ester (8.3) of trans-cyclohexane dicarboxylic acid was prepared via the acid chloride esterification method using 4-hydroxybutylacrylate. This acid was reacted with intermediate 2 (3.6) to give the diester (8.4). This compound was allowed to react with diiodobenzene under Sonogashira conditions to give the target compound (8.5).

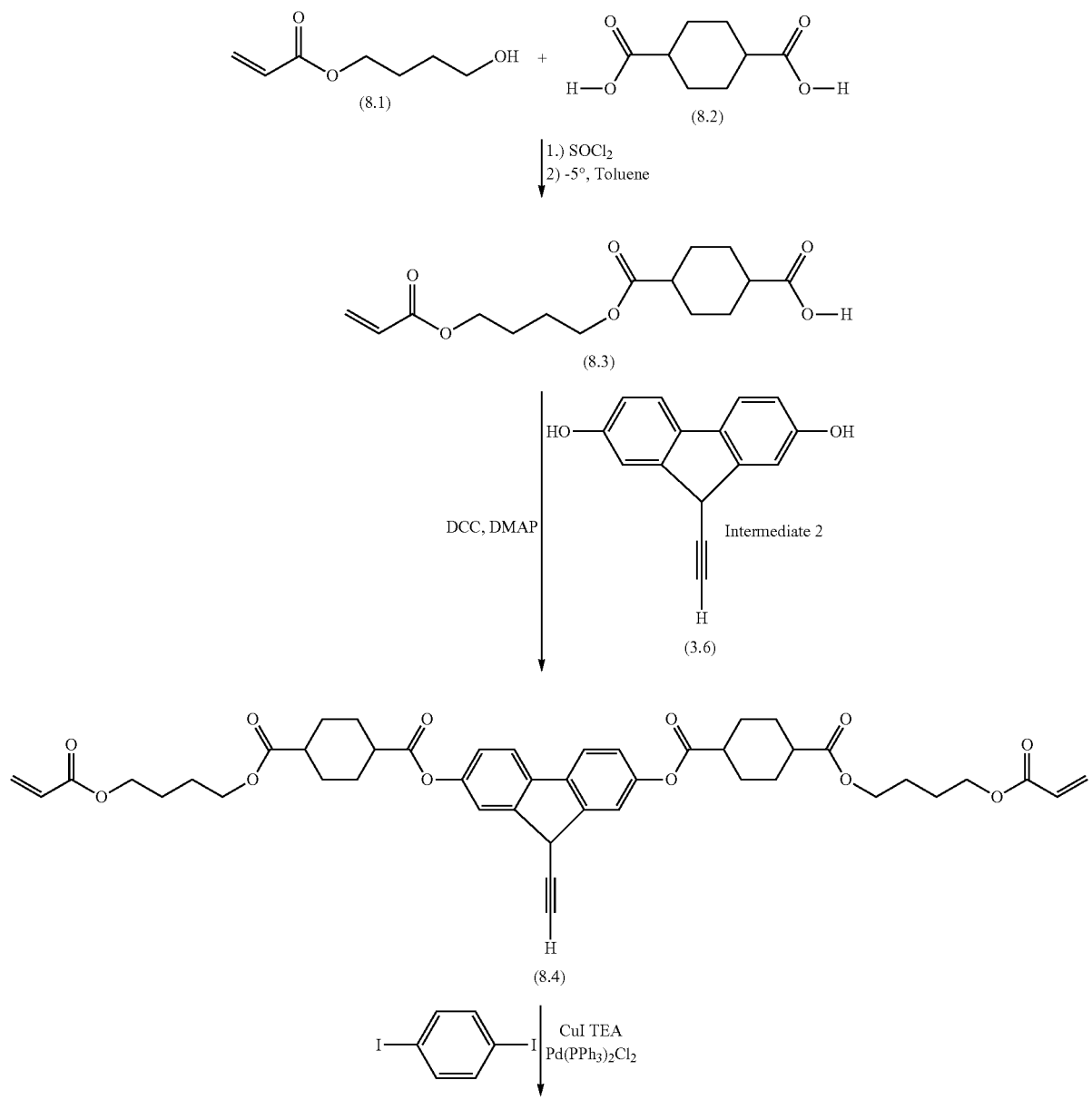

Scheme 6:

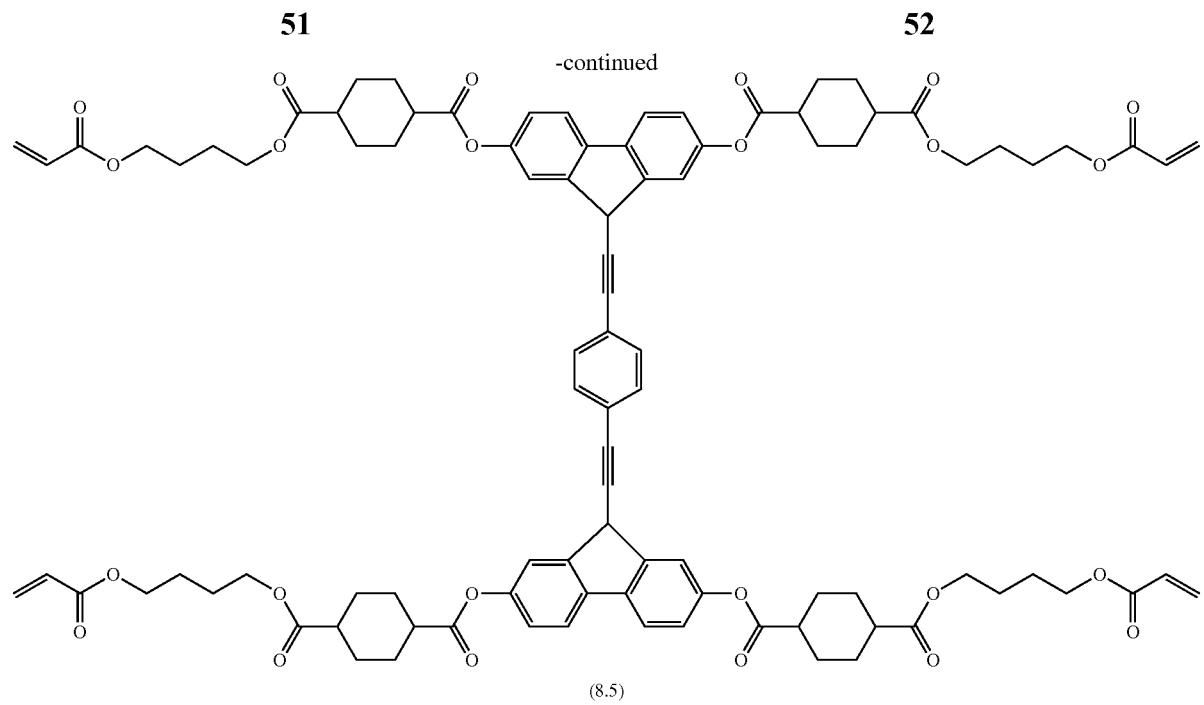

(8.5)

EXAMPLE 7

Compound 9.8 is prepared according to Scheme 7. Methyl, 4-bromobenzoate (9.1) is reacted under Sonogashira conditions with propalgyl alcohol (9.2) to give compound 9.3. Hydrogenation of 9.3 gave compound 9.4 which after hydrolysis of the ester and subsequent treatment with acrylic acid under Dean and Stark conditions gace the acid 9.6. This acid was reacted with intermediate 2 (3.6) to give the diester 9.7 which was further allowed to react with diiodibenzene under Sonogashira conditions to give the target compound 9.8.

Scheme 7:

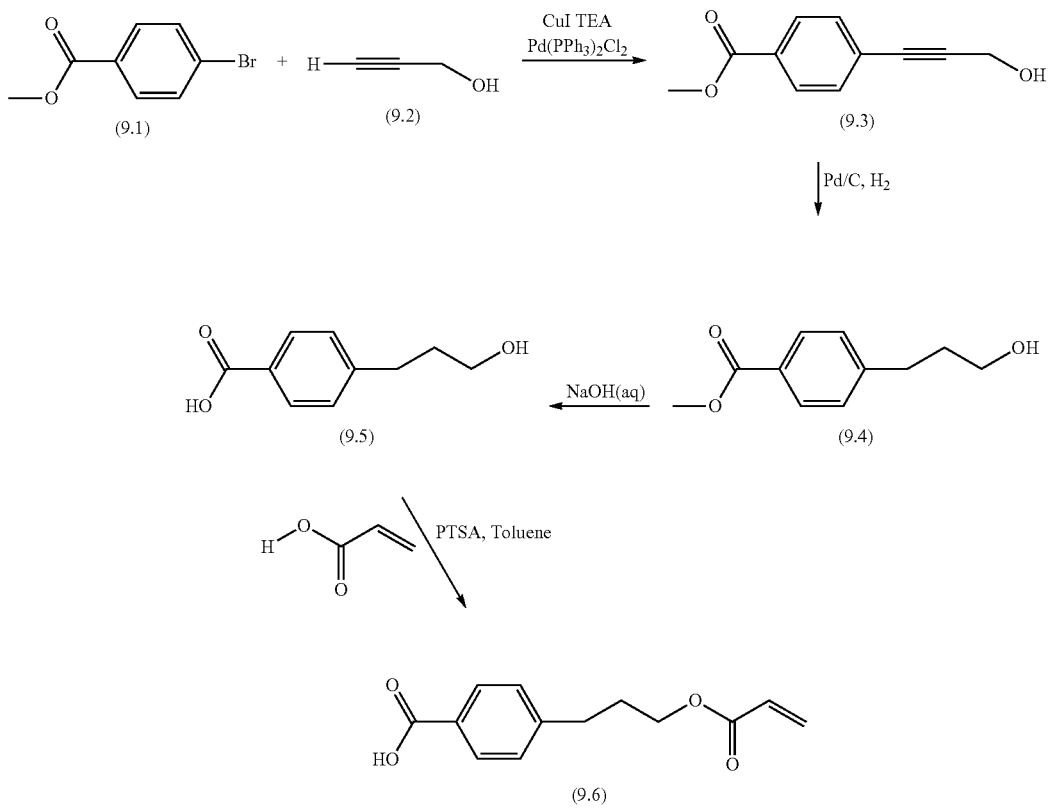

-continued
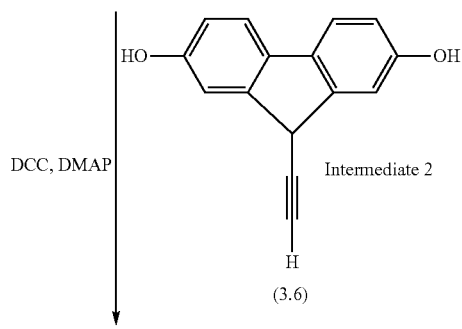
Intermediate 2
(3.6)
DCC, DMAP
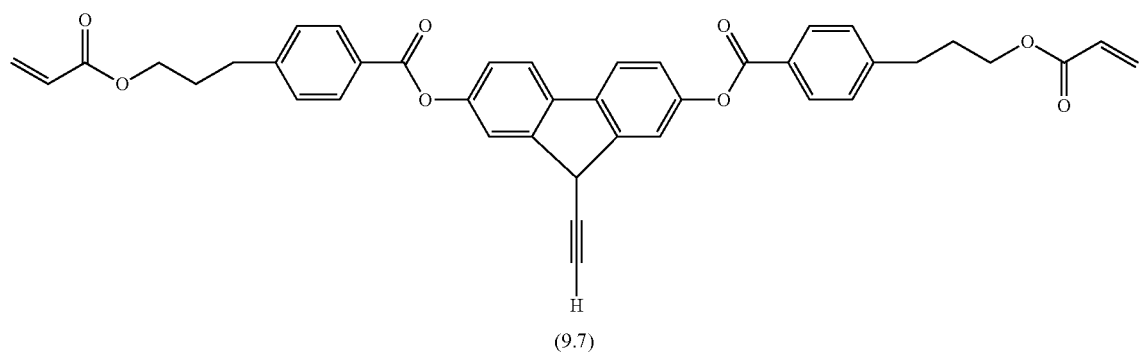
(9.7)
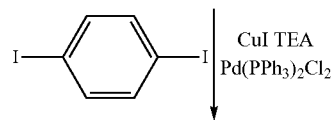
CuI TEA
Pd(PPh$_3$)$_2$Cl$_2$
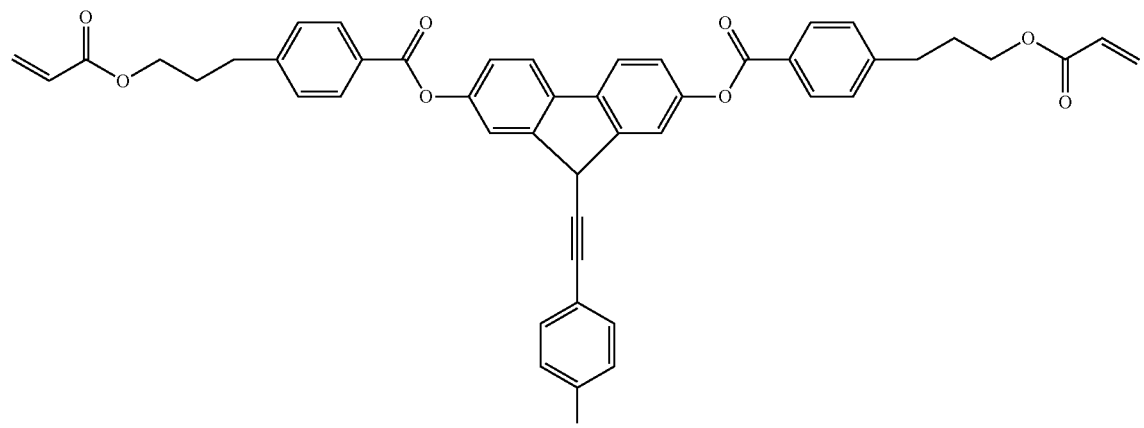
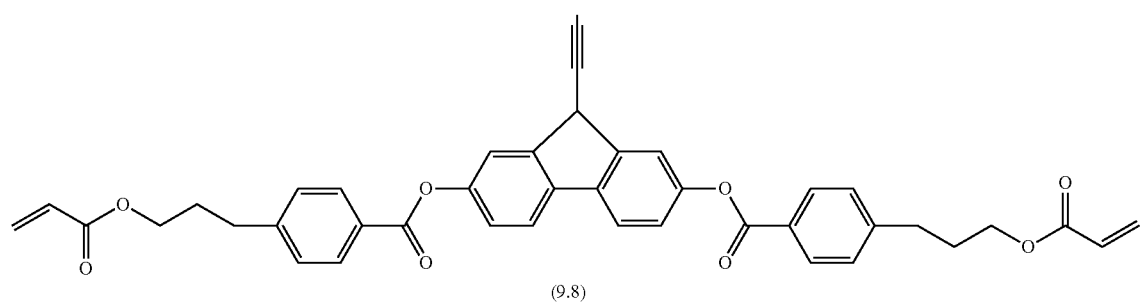
(9.8)

The invention claimed is:

1. A compound comprising one or more structural elements of the following formula

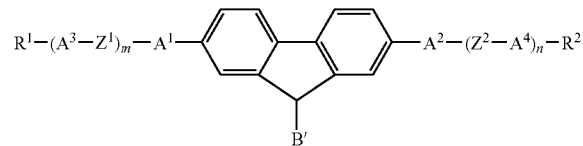

wherein
B' is —(B)$_q$— or —(B)$_q$—R$^3$,
B is —C≡C—, —CY$^1$=CY$^2$— or an optionally substituted aromatic or heteroaromatic group,
q is an integer from 1 to 10,
Y$^{1,2}$ are independently of each other H, F, Cl, CN or R$^0$,
A$^{1-4}$ are independently of each other identical or different groups selected from non-aromatic, aromatic or heteroaromatic carbocyclic or heterocyclic groups, which are optionally substituted by one or more groups R$^1$,
Z$^{1,2}$ are independently of each other identical or different groups selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
R$^0$ and R$^{00}$ are independently of each other H or alkyl with 1 to 12 C-atoms,
m and n are independently of each other 0, 1, 2, 3 or 4,
R$^{1-3}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^{1-3}$ denoting or being substituted by P or P-Sp-,
P is a polymerizable group,
Sp is a spacer group or a single bond,
and wherein the fluorene group is optionally substituted by one or more groups R$^1$.

2. A compound according to claim 1, selected from the following formulae

I

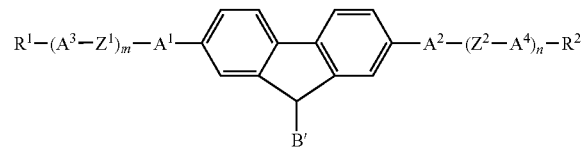

II

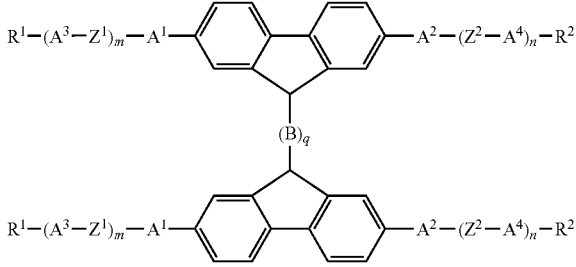

wherein the fluorene group is optionally substituted by one or more groups R$^1$.

3. A compound according to claim 1,
wherein —(B)$_q$— is selected from —C≡C—, —C≡C—C≡C—, —C≡C—C≡C—C≡C—, —C≡C—C≡C—C≡C—C≡C—,

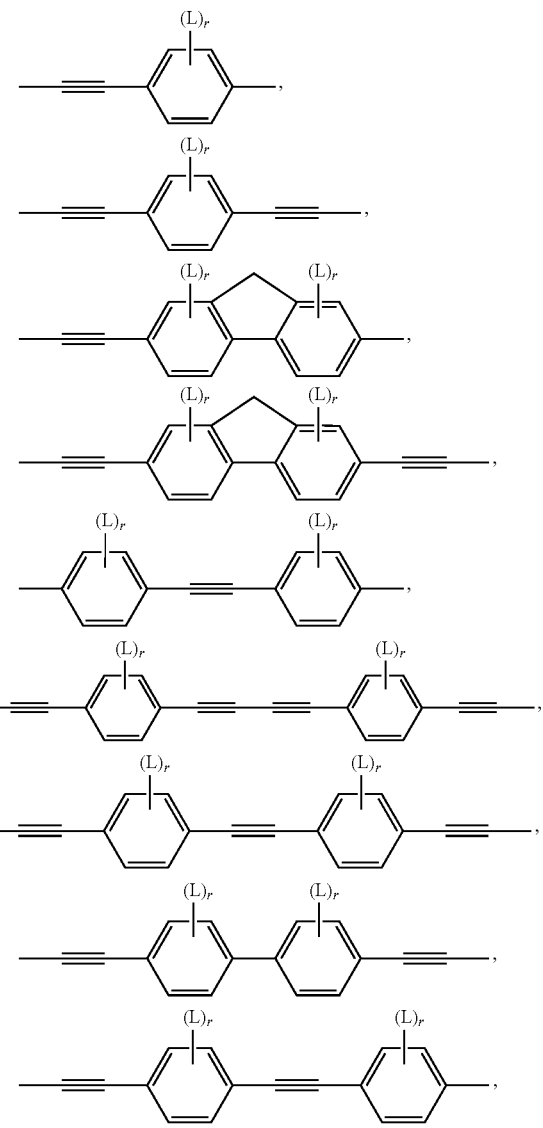

-continued

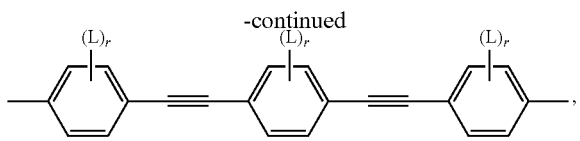

wherein
r is 0, 1, 2, 3 or 4,
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, and
X is halogen.

4. A compound according to claim 1, wherein
A$^{1-4}$ are selected from trans-1,4-cyclohexylene and 1,4-phenylene that is optionally substituted with one or more groups L,
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, and
X is halogen.

5. A compound according to claim 1, wherein Z$^{1,2}$ are selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond.

6. A compound according to claim 1, wherein
P is selected from CH$_2$=CW$^1$—COO—, CH$_2$=CW$^1$—CO—,

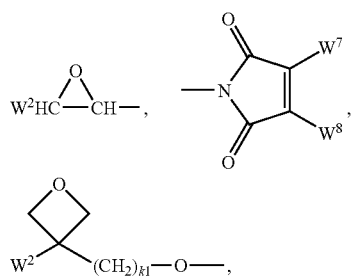

CH$_2$=CW$^2$—(O)$_{k1}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, W$^1$ is H, F, Cl, CN, CF$_3$, phenyl or alkyl with 1 to 5 C-atoms,
W$^2$ and W$^3$ are independently of each other H or alkyl with 1 to 5 C-atoms,
W$^4$, W$^5$ and W$^6$ are independently of each other Cl, oxaalkyl or oxacarbonylalkyl with 1 to 5 C-atoms,
W$^7$ and W$^8$ are independently of each other H, Cl or alkyl with 1 to 5 C-atoms,
Phe is 1,4-phenylene that is optionally substituted, and
k$_1$ and k$_2$ are independently of each other 0 or 1.

7. A compound according to claim 1, wherein
Sp is of formula Sp'-X', such that P-Sp- is P-Sp'-X',
Sp' is alkylene with 1 to 20 C atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, and
X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond.

8. A compound s according to claim 1, selected from the following subformulae

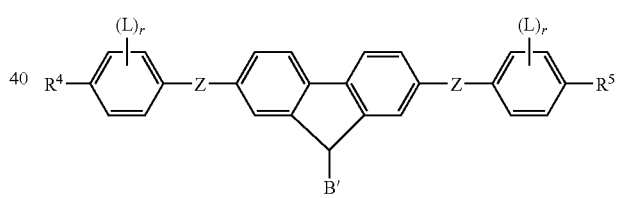

Ia

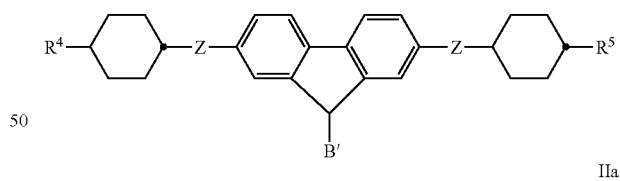

Ib

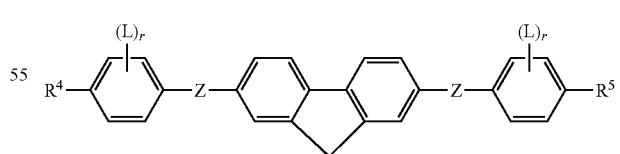

IIa

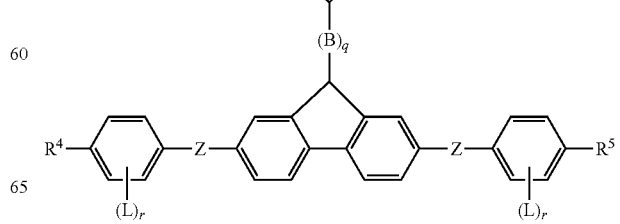

-continued

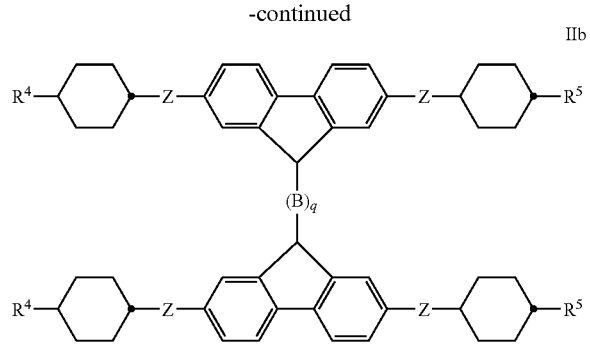
IIb

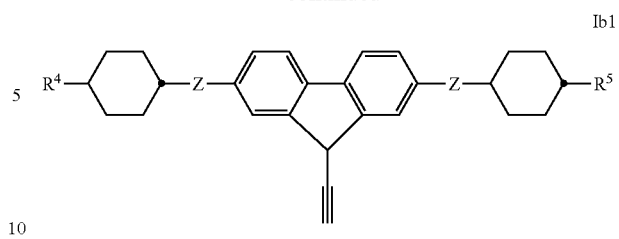
Ib1 wherein r is 0, 1, 2, 3 or 4,

L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, X is halogen R$^4$ and R$^5$ are have independently of each other selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^{1-3}$ denoting or being substituted by P or P-Sp-, and Z is selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond.

9. A compound s according to claim 1, selected from the following subformulae:

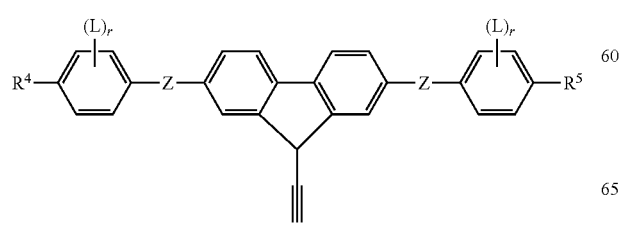
Ia1

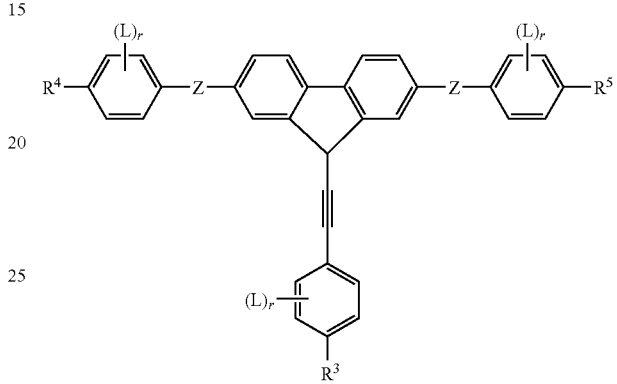
Ia2

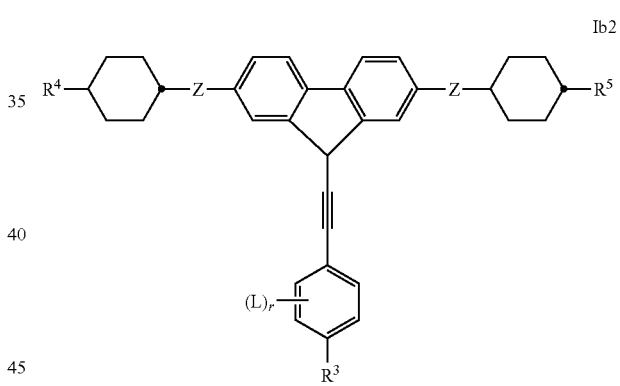
Ib2

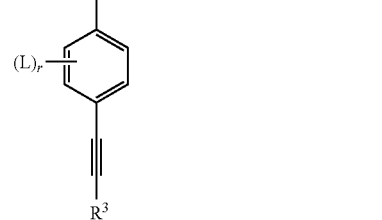
Ia3

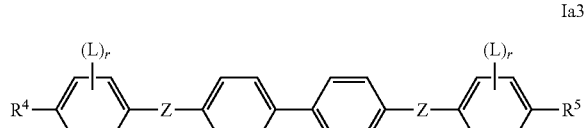

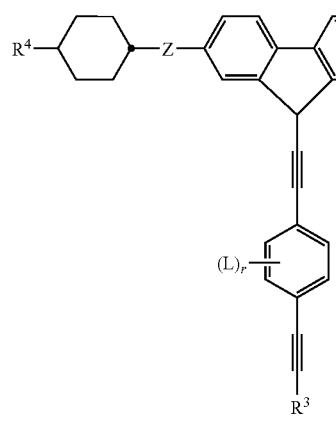
Ib3
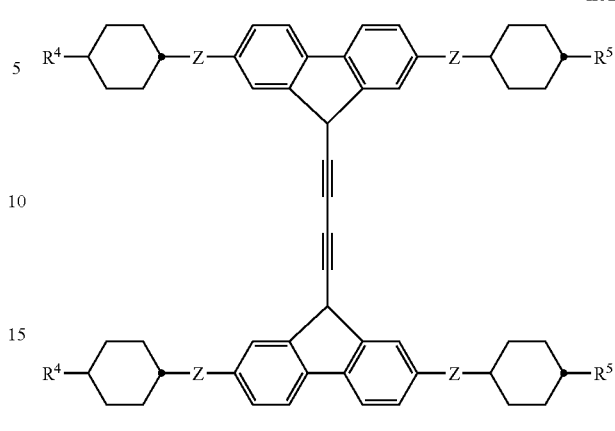
IIb2
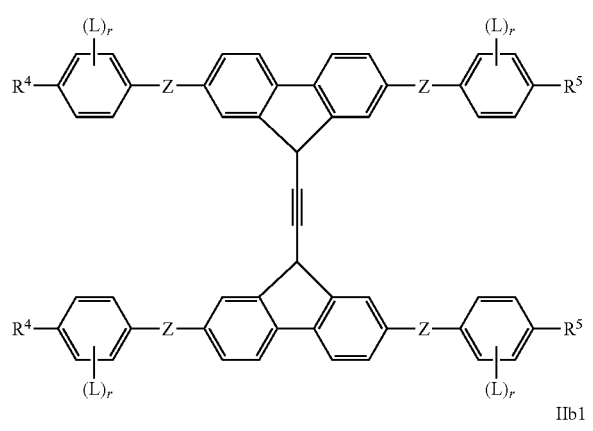
IIa1
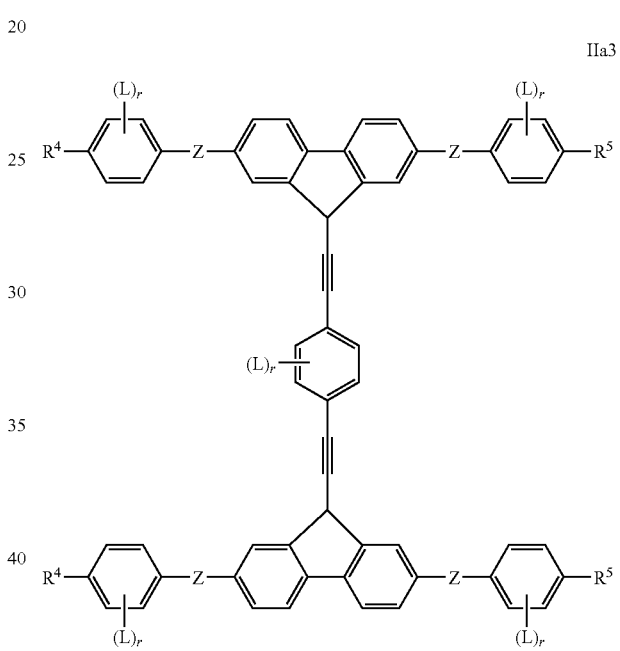
IIa3
IIb1
IIa2
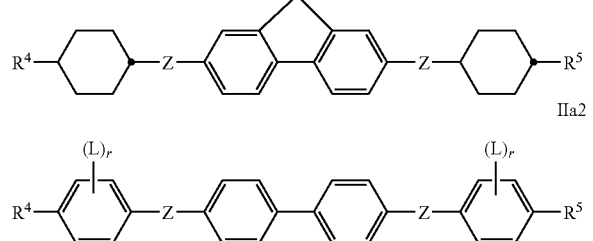
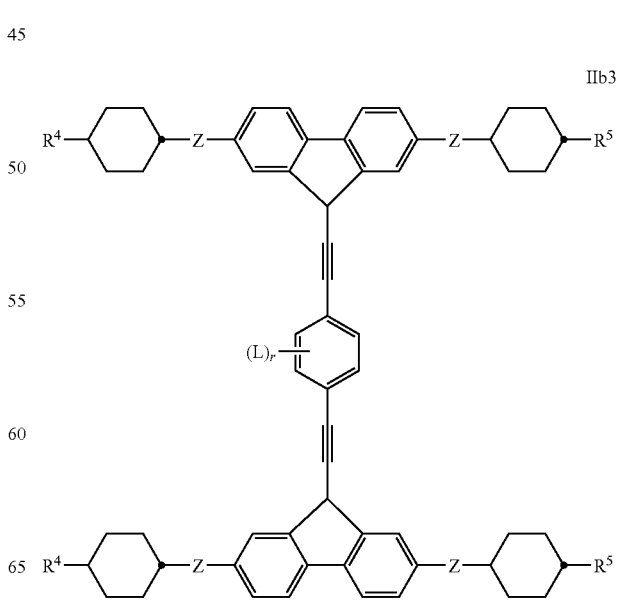
IIb3

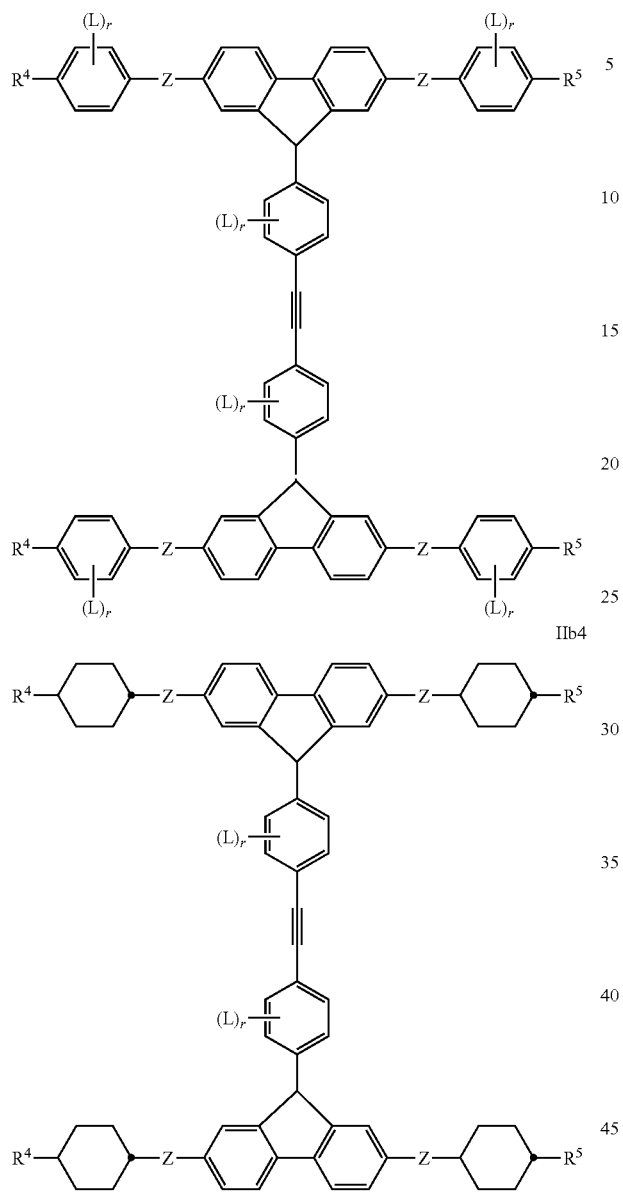

wherein
r is 0, 1, 2, 3 or 4,
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with 1 to 12, and straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl,
X is halogen
R$^4$ and R$^5$ are have independently of each other selected from H, halogen, —CN, —NC, —NCO, —NCS, —OCN, —SCN, —C(=O)NR$^0$R$^{00}$, —C(=O)X$^0$, —C(=O)R$^0$, —NH$_2$—, NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^{1-3}$ denoting or being substituted by P or P-Sp-, and Z is selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —H=CH—COO—, —OCO—CH=CH—, CR$^0$R$^{00}$ or a single bond.

10. An LC formulation comprising one or more compounds according to claim 1.

11. A polymerizable LC formulation comprising one or more compounds according to claim 1, and one or more further compounds, wherein at least one of the compounds is polymerizable.

12. A birefringent polymer film obtainable by polymerizing a compound according to claim 1 in its LC phase in an oriented state in the form of a thin film.

13. A birefringent polymer film with $R_{450}/R_{550}<1$, wherein $R_{450}$ is the optical on-axis retardation at a wavelength of 450 nm and $R_{550}$ is the optical on-axis retardation at a wavelength of 550 nm, said film being obtainable by polymerizing one or more compounds according to claim 1.

14. In an optical, electronic and electrooptical component or device, the improvement wherein said optical, electronic and electrooptical component or device contains a compound according to claim 1.

15. An optical, electronic or electrooptical component or device, comprising a polymer film according to claim 12.

16. An optical component according to claim 15, wherein said component is an optically uniaxial film selected from an A-plate, C-plate, negative C-plate or O-plate, a twisted optical retarder, a twisted quarter wave foil (QWF), an optically biaxial film, an achromatic retarder, an achromatic QWF or half wave foil (HWF), a film having a cholesteric, smectic, nematic or blue phase, a film having homeotropic, splayed, tilted, planar or blue-phase alignment, which is uniformly oriented or exhibits a pattern of different orientations.

17. An optical component according to claim 15, wherein said component is an optical compensation film for viewing angle enhancement of LCD's, a component in a brightness enhancement films, or an achromatic element in reflective or transflective LCD's.

18. A device or component according to claim 15, selected from electrooptical displays, LCDs, optical films, polarizers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

19. A method for preparing a compound according to claim 1, comprising the steps of a) reacting a cyclohexylmethyl phenyl ketone or benzyl cyclohexyl ketone with a protected acetylene and n-butyl lithium to give an alcohol-acetylene intermediate,
b) reducing the intermediate from step a) using triethylsilane to form a lateral acetylene compound,
c) homocoupling the lateral acetylene from step b) to form a dimer, or coupling the lateral acetylene from step b) with an arylhalide or with a dihaloaromatic intermediate to form a lateral phenylacetylene.

* * * * *

UNITED STATES PATENT AND TRADEMARK OFFICE
CERTIFICATE OF CORRECTION

PATENT NO.       : 8,323,527 B2
APPLICATION NO.  : 12/676054
DATED            : December 4, 2012
INVENTOR(S)      : Adlem et al.

It is certified that error appears in the above-identified patent and that said Letters Patent is hereby corrected as shown below:

In the Claims:

Column 64, line 16 reads "-H=CH-COO-, -OC0-CH=CH-," should read
-- -CH=CH-COO-, -OC0-CH=CH-, --

Signed and Sealed this
Twenty-first Day of May, 2013

Teresa Stanek Rea
*Acting Director of the United States Patent and Trademark Office*